United States Patent
Amin et al.

(10) Patent No.: US 7,335,909 B2
(45) Date of Patent: Feb. 26, 2008

(54) SUPERCONDUCTING PHASE-CHARGE QUBITS

(75) Inventors: Mohammad H. S. Amin, Vancouver (CA); Jeremy P. Hilton, Vancouver (CA); Geordie Rose, Vancouver (CA)

(73) Assignee: D-Wave Systems Inc., Vancouver (CA)

( * ) Notice: Subject to any disclaimer, the term of this patent is extended or adjusted under 35 U.S.C. 154(b) by 326 days.

(21) Appl. No.: 10/934,049

(22) Filed: Sep. 3, 2004

(65) Prior Publication Data

US 2005/0082519 A1   Apr. 21, 2005

Related U.S. Application Data

(60) Provisional application No. 60/557,749, filed on Mar. 29, 2004, provisional application No. 60/518,801, filed on Nov. 6, 2003, provisional application No. 60/514,132, filed on Oct. 24, 2003, provisional application No. 60/500,961, filed on Sep. 5, 2003.

(51) Int. Cl.
*H01L 29/06* (2006.01)

(52) U.S. Cl. .......................... 257/34; 257/30; 257/31; 257/E39.003; 977/933; 505/170

(58) Field of Classification Search ............ 257/30, 257/31, 34; 505/170
See application file for complete search history.

(56) References Cited

U.S. PATENT DOCUMENTS

| | | | |
|---|---|---|---|
| 5,323,344 A | 6/1994 | Katayama et al. | |
| 5,917,322 A | 6/1999 | Gershenfeld et al. | |
| 6,563,310 B2 | 5/2003 | Zagoskin | |
| 6,563,311 B2 | 5/2003 | Zagoskin | |
| 6,573,202 B2 | 6/2003 | Ivanov et al. | |
| 6,670,630 B2 | 12/2003 | Blais et al. | |
| 6,784,451 B2 | 8/2004 | Amin et al. | |
| 2002/0117656 A1 | 8/2002 | Amin et al. | |
| 2002/0188578 A1 | 12/2002 | Amin et al. | |
| 2003/0164490 A1 | 9/2003 | Blais | |
| 2003/0207766 A1 | 11/2003 | Esteve et al. | |

(Continued)

FOREIGN PATENT DOCUMENTS

WO    WO9914614 A1    3/1999

(Continued)

OTHER PUBLICATIONS

Aassime et al. "Radio Frequenc Single-Electron Transitor as a Readout device for Qubits:Charge Sensitivity and Backaction" Physical Review Letters vol. 86, 3376 Apr. 9, 2001.*

(Continued)

*Primary Examiner*—Chandra Chaudhari
*Assistant Examiner*—Matthew L. Reames
(74) *Attorney, Agent, or Firm*—Seed IP Law Group PLLC

(57) ABSTRACT

A quantum computing structure comprising a superconducting phase-charge qubit, wherein the superconducting phase-charge qubit comprises a superconducting loop with at least one Josephson junction. The quantum computing structure also comprises a first mechanism for controlling a charge of the superconducting phase-charge qubit and a second mechanism for detecting a charge of the superconducting phase-charge qubit, wherein the first mechanism and the second mechanism are each capacitively connected to the superconducting phase-charge qubit.

96 Claims, 7 Drawing Sheets

U.S. PATENT DOCUMENTS

| | | |
|---|---|---|
| 2003/0224944 A1 | 12/2003 | Il'ichev et al. |
| 2004/0029050 A1 | 2/2004 | Brenner et al. |
| 2004/0077503 A1 | 4/2004 | Blais et al. |
| 2004/0098443 A1 | 5/2004 | Omelyanchouk et al. |

FOREIGN PATENT DOCUMENTS

| | | |
|---|---|---|
| WO | WO 02/097725 A2 | 12/2002 |

OTHER PUBLICATIONS

Berkley et al. "Entangle Macroscopic Quantum States in Two Superconducting Qubits" Science vol. 300, 1548 Jun. 6, 2003.*

Averin, D.V., 2000, "Quantum Computing and Quantum Measurements with Mesoscopic Josephson Junctions," Fortschritte der Physik 48, pp. 1055-1074, also published in Braunstein, S. L., and H.-K. Lo (eds.), 2000, *Scalable Quantum Computers*, Wiley-VCH, Berlin, ISBN 3-527-40321-3.

Astafiev, O., Yu.A. Pashkin, T. Yamamoto, Y. Nakamura, and J.S. Tsai, 2004 "Single-shot measurement of the Josephson charge qubit," ArXiv.org preprint server: cond-mat/0402619, last accessed on Sep. 23, 2004.

Brennen, G.K., D. Song, and C.J. Williams, 2003, "Quantum-computer architecture using nonlocal interactions," Phys. Rev. A 67, 050302.

Blatter, G., V.B. Geshkenbein, and L. Ioffe, 2001, "Engineering Superconducting Phase Qubits," Phys. Rev. B 63, 174511.

Bocko, M.F., A.M. Herr, and M.J. Feldman, 1997, "Prospects for Quantum Coherent Computation Using Superconducting Effects," IEEE Trans. Appl. Supercond. 7, pp. 3638-3641.

Bouchiat, V., D. Vion, P. Joyez, D. Esteve, and M. H. Devoret, 1998, "Quantum coherence with a single Cooper pair," Physica Scripta T76, pp. 165-170.

Boulant N., T.F. Havel, M.A. Pravia, and D.G. Cory, 2002, "A Robust Method for Estimating the Lindblad Operators of a Dissipative Quantum Process from Measurements of the Density Operator at Multiple Time Points," ArXiv.org preprint server: quant-ph/0211046v1, last accesssed on Sep. 23, 2004.

Cottet, A., D. Vion, A. Aassime, P. Joyez, D. Esteve, and M.H. Devoret, 2002, "Implementation of a combined charge-phase quantum bit in a superconducting circuit," Physica C 367, pp. 197-203.

D'Ariano, G.M., and P. Lo Presti, 2001, "Quantum Tomography for Measuring Experimentally the Matrix Elements of an Arbitrary Quantum Operation," Phys. Rev. Lett. 86, pp. 4195-4198.

De Martini, F., A. Mazzei, M. Ricci, and G.M. D'Ariano, 2002, "Exploiting quantum parallelism of entanglement for a complete experimental quantum characterization of a single qubit device," ArXiv.org preprint server: quant-ph/0210210v1, last accessed on Sep. 23, 2004.

Deutsch, D., 1985, "Quantum theory, the Church-Turing principle and the universal quantum computer," Proceedings of the Royal Society of London A 400, pp. 97-117.

DiVincenzo, D., 2000, "The Physical Implementation of Quantum Computation," ArXiv.org preprint server: quant-ph/00002077, last accessed on Aug. 20, 2004. Also published in Braunstein, S. L., and H.-K. Lo (eds.), 2000, *Scalable Quantum Computers*, Wiley-VCH, Berlin, ISBN 3-527-40321-3.

Friedman, J.R., and D.V. Averin, 2002, " Aharonov-Casher-Effect Suppression of Macroscopic Tunneling of Magnetic Flux," Phys. Rev. Lett. 88, 050403.

Friedman, J.R., V. Patel, W. Chen, S.K. Tolpygo and J.E. Lukens, 2000, "Quantum superposition of distinct macroscopic states," Nature 406, pp. 43-46.

Feynman, R., 1982, "Simulating Physics with Computers", Int. J. Theor. Phys. 21, pp. 467-488.

Il'ichev, E., et al., 2003, "Continuous Monitoring of Rabi Oscillations in a Josephson Flux Qubit," Phys. Rev. Lett. 91, 097906, also published as ArXiv.org preprint server: cond-mat/0303433.

Lehnert, K.W., K. Bladh, L.F. Spietz, D. Gunnarsson, D.I. Schuster, P. Delsing, and R.J. Schoelkopf, 2003, "Measurement of the Excited-State Lifetime of a Microelectronic Circuit," Physical Review Letters 90, 027002.

Maassen van den Brink, A., 2002, "Quantum-efficient charge detection using a single-electron transistor," Europhys. Lett. 58, pp. 562-568.

Makhlin, Y., G. Schön, and A. Shnirman, 2001, "Quantum-State Engineering with Josephson-Junction Devices," Rev. Mod. Phys. 73, pp. 357-400.

Makhlin, Y., G. Schön, and A. Shnirman, 2000, "Josephson-Junction Qubits," Fortschritte der Physik 48, pp. 1043-1054, also published in Braunstein, S. L., and H.-K. Lo (eds.), 2000, *Scalable Quantum Computers*, Wiley-VCH, Berlin, ISBN 3-527-40321-3.

"Mesoscopic," *McGraw-Hill Encyclopedia of Science & Technology*, vol. 10, p. 722 ($8^{th}$ ed. 1997).

Mooij, J.E., T.P. Orlando, L. Levitov, L. Tian, C.H. van der Wal, and S. Lloyd, 1999, "Josephson Persistent-Current Qubit,"Science 285, pp. 1036-1039.

Nakamura, Y., Y.A. Pashkin, and J.S. Tsai, 1999, "Coherent control of macroscopic quantum states in a single-Cooper-pair box," Nature 398, pp. 786-788.

Nielsen, M.A., and I.L. Chuang, 2000, *Quantum Computation and Quantum Information*, Cambridge University Press, Cambridge, UK, pp. 80-97.

Orlando, T.P., J. E. Mooij, C.H. van der Wal, L.S. Levitov, S. Lloyd, J.J. Mazo, 1999, "Superconducting persistent -current qubit,"Phys. Rev. B 60, pp. 15398-15413.

Pashkin, Yu.A., T. Yamamoto, O. Astafiev, Y. Nakamura, D.V. Averin, and J.S. Tsai, 2003, "Quantum oscillations in two coupled charge qubits," Nature 421, pp. 823-826.

Ramos, R.C., M.A. Gubrud, A.J. Berkley, J.R. Anderson, C.J. Lobb et al., 2001, IEEE Trans. App. Sup., 11, 998.

Schoelkopf, R.J., P. Wahlgren, A.A. Kozhevnikov, P. Delsing, and D.E. Prober, 1998, "The radio-frequency single electron transistor (rf-SET): a fast and ultrasensitive electrometer," Science 280, pp. 1238-1241.

Spiller, T.P., 2000, "Superconducting Circuits for Quantum Computing," Fortschritte der Physik 48, pp. 1075-1094, also published in Braunstein, S. L., and H.-K. Lo (eds.), 2000, *Scalable Quantum Computers*, Wiley-VCH, Berlin, ISBN 3-527-40321-3.

Van der Wal, C.H., A.C.J. ter Haar, F. K. Wilhelm, R.N. Schouten, C.J.P.M. Harmans, T.P. Orlando, S. Lloyd and J.E. Mooij, 2000, "Quantum Superosition of Macroscopic Persistent-Current States," Science 290, pp.773-777.

Vion, D., A. Aassime, A. Cottet, P. Joyez, H. Pothier, C. Urbina, D. Esteve, M.H. Devoret, 2002, "Manipulating the Quantum State of an Electrical Circuit", Science 296, pp. 886-889.

Vion, D., A. Aassime, A. Cottet, P. Joyez, H. Pothier, C. Urbina, D. Esteve, and M.H. Devoret, 2002, "Ramsey Fringe Measurements of Decohernce in a Novel Superconducting Quantum Bit Based on the Copper Pair Box," Physica Scripta T102, 162-166.

International Search Report and Written Opinion, dated Jan. 21, 2005, for PCT/CA2004/001634, 12 pages.

* cited by examiner

SUPERCONDUCTING PHASE-CHARGE QUBITS

RELATED APPLICATIONS

The present application claims benefit, under 35 U.S.C. § 119(e), of U.S. Provisional Patent Application Nos. 60/557,749 entitled "Charge-phase qubit," filed Mar. 29, 2004; 60/518,801 entitled "Charge Control of the Phase Qubit," filed Nov. 6, 2003; 60/514,132 entitled "Charge Control of the phase qubit," filed Oct. 24, 2003; and 60/500,961 entitled "Charge control of the phase qubit," filed Sep. 5, 2003 each of which is hereby incorporated by reference in its entirety.

1. FIELD OF THE INVENTION

This invention relates to the field of quantum computing and to the field of superconducting devices.

2. BACKGROUND

Research on what is now called quantum computing was noted by Richard Feynman. See Feymnan, 1982, International Journal of Theoretical Physics 21, pp. 467-488 which is hereby incorporated by reference in its entirety. Feynman observed that quantum systems are inherently difficult to simulate with conventional computers but that observing the evolution of an analogous quantum system could provide an exponentially faster way to solve the mathematical model of a system. In particular, solving a model for the behavior of a quantum system commonly involves solving a differential equation related to the Hamiltonian of the quantum system. David Deutsch observed that a quantum system could be used to yield a time savings, later shown to include exponential time savings, in certain computations. If one had a problem, modeled in the form of an equation that represented the Hamiltonian of the quantum system, the behavior of the system could provide information regarding the solutions to the equation. See Deutsch, 1985, Proceedings of the Royal Society of London A 400, pp. 97-117 which is hereby incorporated by reference in its entirety.

One limitation in the quantum computing art is the identification of systems that can support quantum computation. As detailed in the following sections, a qubit, which is analogous to a "bit" of a classical digital computer, serves as the basis for performing quantum computation. However, in order to perform such quantum computations, qubits must be able to retain their quantum behavior long enough to perform quantum computations. The loss of quantum behavior is referred to as decoherence. Further, techniques for reading the state of qubits are needed in order to determine the result of a quantum computation. Ideally, such readout mechanisms do not introduce a source of decoherence to the quantum computing system.

The computing power of quantum devices increases as the basic building blocks of a quantum computer, qubits, are coupled together in such a way that the quantum state of one qubit affects the quantum state of each of the qubits to which it is coupled. This form of coupling is referred to as entanglement. Another limitation in the quantum computing art is the identification of methods that can be used to controllably entangle the states of qubits without introducing a significant source of decoherence.

2.1 Qubits

A quantum bit or "qubit" is the building block of a quantum computer in the same way that a conventional binary bit is a building block of a classical computer. The conventional binary bit adopts the values "0" or "1", which can be termed the "states" of the conventional binary bit. A qubit is similar to a conventional binary bit in the sense that it can adopt states, called "basis states". The basis states of a qubit are referred to as the $|0>$ and $|1>$ basis states. During quantum computation, the state of a qubit is defined as a superposition of the $|0>$ and $|1>$ basis states. This means that the state of the qubit simultaneously has a nonzero probability of occupying the $|0>$ basis state and a nonzero probability of occupying the $|1>$ basis state. The ability of a qubit to have both a nonzero probability of occupying a first basis state $|0>$ and a nonzero probability of occupying a second basis state $|1>$ is different from a conventional bit, which always has a value of 0 or 1.

Qualitatively, a superposition of basis states means that the qubit can be in both the $|0>$ and $|1>$ basis states at the same time. Mathematically, a superposition of basis states means that the overall state of the qubit, which is denoted $|\Psi>$, has the form $|\Psi>=a|0>+b|1>$, where a and b are coefficients corresponding to the probability amplitudes $|a|^2$ and $|b|^2$, respectively. The coefficients a and b each have real and imaginary components, which allows the phase of qubit to be modeled. The quantum nature of a qubit is largely derived from its ability to exist in a coherent superposition of basis states, and for the state of the qubit to have a phase. A qubit will retain this ability to exist as a coherent superposition of basis states when the qubit is sufficiently isolated from sources of decoherence.

To complete a computation using a qubit, the state of the qubit must be measured (e.g., read out). When the state of the qubit is measured the quantum nature of the qubit is temporarily lost and the superposition of basis states collapses to either the $|0>$ basis state or the $|1>$ basis state, thus regaining its similarity to a conventional bit The actual state of the qubit after it has collapsed depends on the probability amplitudes $|a|^2$ and $|b|^2$ immediately prior to the readout operation.

2.2 General Superconducting Qubits

An important class of qubits are those qubits that are superconducting. Superconducting qubits generally fall into two categories, phase qubits and charge qubits. Phase qubits are those that store and manipulate information in the phase states of the device. Charge qubits store and manipulate information in the charge states of the device. In superconducting materials, phase is a property of the superconducting condensate and elementary charges are represented by pairs of electrons called Cooper pairs. The division of such devices into two classes is outlined in Makhlin et al., 2001, "Quantum-State Engineering with Josephson-Junction Devices," Reviews of Modern Physics 73:357, pp. 357-401, which is incorporated herein by reference in its entirety.

Phase and charge are related values in superconductors and, at energy scales where quantum effects dominate, the Heisenberg uncertainty principle dictates that certainty in phase leads to uncertainty in charge and, conversely, certainty in charge leads to uncertainty in the phase of the system. Superconducting phase qubits operate in the phase regime, where each of the basis states consists of either a small number of distinct phase states or a large number of charge states. These basis states can be used in accordance with well-known principles of quantum mechanics and quantum information science to perform useful calculations.

Phase and charge qubits can be classified by the ratios of different energies of the respective qubits. These energies, often the charging and Josephson energies, depend on physical parameters of the respective qubits. The charging energy $E_C$ of a superconducting structure, such as a qubit junction is defined as $e^2/(2C)$, where C is the capacitance of the superconducting structure. The Josephson energy, $E_J$, of a Josephson junction is related to the critical current of a superconducting structure. For example, the $E_J$ of a Josephson junction is proportional to the critical current $I_C$, $E_J=\hbar/2e)I_C$, where $\hbar$ is Planck's constant divided by $2\pi$, and e is the elementary charge. For superconducting qubits the ratio of these two energies gives an indication as to whether a qubit is a charge or phase qubit. The metric, $\Gamma=4E_C/E_J$ can show whether a qubit is a phase or charge qubit. When $\Gamma$ is much greater than unity, the qubit is a charge qubit. There is no agreement in the art what greater than unity means. In some qubit examples, when $\Gamma$ is greater than 100, the qubits are deemed to be charge qubits. In other qubit examples, when $\Gamma$ is greater than 30, the qubits are deemed to be charge qubits. In yet other qubit examples, when $\Gamma$ is greater than 10, the qubits are deemed to be charge qubits. When $\Gamma$ is much less than unity, the qubit is deemed to be a phase qubit. In some qubit examples of qubits, when $\Gamma$ is less than $1/10$, the qubits are deemed to be phase qubits. In other qubit examples, when $\Gamma$ is less than $1/30$, the qubits are deemed to be phase qubits. In yet other examples of qubits, when $\Gamma$ is less than $1/100$, the qubits are deemed to be phase qubits.

Experimental realization of superconducting devices as qubits was made by Nakamura et al., 1999, Nature 398, p. 786, which is hereby incorporated by reference in its entirety. Nakamura et al. developed a charge qubit that demonstrates the basic operational requirements for a qubit but with poor (short) decoherence times and stringent requirements on control parameters.

Superconducting qubits have two modes of operation related to coupling with the outside environment. When the qubit is initialized or measured, the qubit is coupled with one or more devices that can initialize or read out the qubit. Thus a first mode of operation of a superconducting qubit involves qubit state preparation and qubit state measurement in which the qubit is coupled to the external environment A second mode of operation of a superconducting qubit involves quantum computation in which the qubit is decoupled from the environment so that decoherence due to environmental noise is minimized. Thus, a superconducting qubit computing device provides a mechanism to couple the qubit to the environment during initialization and measurement and to decouple the qubit from the environment during quantum computation. Efficient functionality of both of these modes and, in particular, the transition between them is a challenge that has not been resolved in the known art.

2.3 Hybrid Qubits

Recently, a superconducting hybrid charge-phase qubit that operates using both phase and charge to store, manipulate, and readout information was proposed and implemented. Having a structure similar to a conventional charge qubit, the hybrid qubit has one degree of freedom in the phase basis and another degree of freedom in the charge basis. Readout involves measuring the phase of the hybrid charge-phase qubit, but computation can involve interaction with either the charge or phase degrees of freedom. See, Vion et al., 2002, Science 296, p. 886, which is hereby incorporated by reference in its entirety. The island of the hybrid charge-phase qubit is a mesoscopic island, whereas the bulk superconductor connected to it is not mesoscopic. The superconducting hybrid charge-phase qubit has demonstrated promise for operating in both of the above modes, however, as a consequence of the charge degree of freedom the superconducting hybrid qubit suffers from harmful charge noise during computation. This charge noise is a source of undesirable decoherence, especially when included in registers containing more than one charge-phase qubit. Thus, the hybrid charge-phase qubit proposal of Vion et al. is unsatisfactory for quantum computation.

The metric, $\Gamma=4E_C/E_J$ can show whether a qubit is a hybrid qubit. When $\Gamma$ is about unity, the qubit is a hybrid qubit. There is no agreement in the art about what unity means in relation to hybrid qubits. In some qubit examples, when $\Gamma$ is between $1/8$ and 8, the qubits are hybrid qubits. In other qubit examples, when $\Gamma$ is between $1/4$ and 4, the qubits are hybrid qubits. In yet other qubit examples, when $\Gamma$ is between $1/2$ and 2, the qubits are hybrid qubits.

2.4 Superconducting Phase Qubits

The superconducting phase qubit is well known and has demonstrated long coherence times, making it a candidate for scalable quantum computing. See, for example, Orlando et al., 1999, Phys Rev. B, 60, 15398, and Il'ichev et al., 2003 "Continuous Monitoring of Rabi Oscillations in a Josephson Flux Qubit," Physical Review Letters 91, pp. 097906-1 to 097906-4, which are hereby incorporated by reference in their entireties. Some other types of phase qubits comprise superconducting loops having more or less than three Josephson junctions. See, for example, Blatter et al., 2001, Phys. Rev. B 63, 174511; and Friedman et al., 2000, Nature 406, p. 43, which are hereby incorporated by reference in their entireties. The phase qubit also has an advantage over charge qubit proposals because it is insensitive to fluctuations or noise in the charge basis, which is considered one of the greatest sources of decoherence in superconducting qubit systems.

FIG. 1 illustrates a superconducting phase qubit. The phase qubit comprises a loop 103 of superconducting material interrupted by Josephson junctions 101-1, 101-2 and 101-3. Josephson junctions are typically formed using standard fabrication processes, generally involving material deposition and lithography stages. See, e.g., Yuda et al., Japanese Journal of Applied Physics 26, L166-L168, 1987, which is hereby incorporated by reference in its entirety. Methods for fabricating Josephson junctions are well known and described in, for example, Ramos et al., 2001, IEEE Trans. App. Sup., 11, 998, which is hereby incorporated by reference in its entirety. Common substrates include silicon, silicon oxide, or sapphire, for example. Josephson junctions can also include insulating materials such as aluminum oxide, for example. Exemplary superconducting materials useful for forming superconducting loop 103 are aluminum and niobium. The Josephson junctions have sizes ranging from about 10 nanometers (nm)×10 nm to about 10 micrometers (μm)×10 μm. One or more of the Josephson junctions 101 has parameters, such as the size of the junction, the junction surface area, the Josephson energy or the charging energy, that differ from the other Josephson junctions in the qubit. The difference between any two Josephson junctions in the phase qubit is characterized by a coefficient, termed α, which typically ranges from about 0.5 to about 1.3. In some instances, the term α for a pair of Josephson junctions in the phase qubit is the ratio of the critical current of the respective Josephson junctions. The critical current of a Josephson junction is the current through the junction at which the junction no longer carries a DC supercurrent. Thus, for example, the term α for junctions 101-1 and 101-2 is defined as the ratio between the critical current of junction 101-1 and the critical current of junction 101-2.

Referring to FIG. 1A, a bias source 110 is inductively coupled to phase qubit 101. Bias source 110 is used to thread a magnetic flux $\Phi_x$ through phase qubit 101 to provide control of the state of the phase qubit. In some instances, phase qubit 101 operates with a magnetic flux bias $\Phi_x$ having a magnitude between about $0.2 \cdot \Phi_0$ and about $0.8 \cdot \Phi_0$, where $\Phi_0 = hc/(2e)$ is the flux quantum.

Phase qubit 101 has a three-dimensional potential with respect to the phases across Josephson junctions 101-1, 101-2, and 101-3. In some instances, phase qubit 101 is biased with a magnetic flux $\Phi_x$, such that the three-dimensional potential profile includes regions of local energy minima, where the local energy minima are separated from each other by small energy barriers and are separated from other regions by large energy barriers, which leads to an effectively two-dimensional potential with respect to the phases across Josephson junctions 101-1, 101-2, and 101-3. In some instances, this two-dimensional potential is a double well potential 100B (FIG. 1B) that includes a left well 160-0 and a right well 160-1, each representing clockwise and counter-clockwise circulating supercurrents 102 in the phase qubit 101 of FIG. 1A. For example, left well 160-0 may represent clockwise circulating supercurrent 102-0 and right well 160-1 may represent counter-clockwise circulating supercurrent 102-1. Alternatively, left well 160-0 may represent counter-clockwise circulating supercurrent 102-1 and right well 160-1 may represent clockwise circulating supercurrent 102-0.

In some cases, the area defined by the inner perimeter of the loop 130 of qubit 101 is between 0.05 μm² and 250,000 μm². In some cases, the area defined by the inner perimeter of loop 103 of qubit 101 is between 0.1 μm² and 250,000 μm². In some cases, the area defined by the inner perimeter of the loop 101 of qubit 101 is between 0.5 μm² and 150 μm². In some cases, the area defined by the inner perimeter of the loop 130 of qubit 201 is between 0.5 μm² and 2.25 μm². In one case, the area defined by the inner perimeter of the loop 130 of qubit 101 is 1 μm². In some cases, the area defined by the inner perimeter of the loop 130 of qubit 101 has a lower bound that is determined by the critical field of niobium or aluminum.

When wells 160-0 and 160-1 are at or near degeneracy, meaning that they are at the same or nearly the same energy potential, as illustrated in FIG. 1B, the quantum state of phase qubit 101 becomes a coherent superposition of the basis states and the device can be operated as a phase qubit. The point at or near degeneracy is herein referred to as the point of computational operation of the phase qubit. During computational operation of the phase qubit, the charge and phase degrees of freedom are balanced so that the information stored in the qubit is localized over a few phase states and delocalized over many charge states. Controllable quantum effects can then be used to process the information stored in those phase states according to the rules of quantum computing. This leaves the phase qubit substantially unaffected by charge noise and thereby prolongs the time under which the qubit can be maintained in a coherent superposition of basis states.

Orlando et al., 1999, Phys Rev. B, 60, 15398, which is hereby incorporated by reference in its entirety, describe a phase qubit consisting of a superconducting loop, three Josephson junctions, and two capacitively coupled voltage sources. In Orlando et al., the capacitively coupled voltage sources are used to demonstrate that the parameters of the phase qubit are not affected by the gate voltage. Orlando et al. also propose a method for coupling phase qubits that consists of providing a loop that inductively couples to a pair of qubits. A key limitation to the phase qubit coupling approach of Orlando et al. is that the coupling is not controllable. Il'ichev et al., 2003, Phys. Rev. Lett. 91, 097906, which is hereby incorporated by reference in its entirety, use a three-Josephson junction flux qubit coupled to a high-quality tank circuit to make a continuous observation of Rabi oscillations.

While reference has been given to phase qubits that include three Josephson junctions and three islands, it will be appreciated that phase qubits can have more or less than three Josephson junctions and more or less than three islands. For example, a phase qubit can have a superconducting loop interrupted by four Josephson junctions and therefore have four islands. In another example, a phase qubit can have a superconducting loop interrupted by five Josephson junctions and therefore have five islands. For example, a phase qubit can have a superconducting loop interrupted by one Josephson junction and therefore has one island. Other examples in which the phase qubit has a superconducting loop interrupted by two, six, seven, eight, nine, ten or more Josephson junctions are within the definition of a phase qubit.

2.5 Phase Qubit Readout Mechanisms

Despite the fact that the phase qubit is one of the most promising superconducting qubit proposals, no satisfactory phase qubit readout scheme exists in the art. For example, while Orlando et al. and Il'ichev et al., discussed above, are significant accomplishments in their own right, neither reference provides satisfactory phase qubit readout mechanisms that are capable of measuring the results of quantum calculations in phase qubits without introducing a significant source of decoherence.

Since information stored in the phase qubit is related to the direction of circulating supercurrent in loop 103 (FIG. 1A), detection of the magnetic flux in the loop, a macroscopic observable, has been used by Orlando et al. to detect the state of the qubit. Detection of the magnetic flux in the phase qubit requires devices that are sensitive to magnetic fields such as direct current superconducting quantum interference devices (DC-SQUIDs). However, the presence of devices such as DC-SQUIDs introduces a significant source of decoherence. Furthermore, inductive shielding between phase qubits is difficult, hence the phase qubit faces imposing scalability issues with respect to unwanted coupling to other qubits and thus to controllable entangling operations.

2.6 Mesoscopic Systems

The term mesoscopic refers to a range of dimensions of intermediate size between mirco- and macro-scopic. When used in connection to condensed matter, the term is often used in conjunction with system. Mesoscopic systems are a class of systems where the single particle approach holds and gives sensible results. It is equally valid to say that single particle effects are noticeable in mesoscopic systems. In mesoscopic systems quantum interference is important, since at low enough temperatures (less than about 1 Kelvin) the phase coherence length of quasiparticles ("electrons") exceeds the size of the system. This means that the electrons preserve their "individuality" when passing through the mesoscopic system. The size scale of interest is determined by the appearance of novel physical phenomena absent in bulk solids and has no rigid definition; however, the systems studied are normally in the range of 100 nanometers to 1000 nm. See, *McGraw-Hill Encyclopedia of Science & Technology*, vol. 10, p. 722 (8th ed. 1997), which is hereby incorporated by reference in its entirety. A mesoscopic system, such as a mesoscopic island, can also be considered to be any system that is small enough to be governed by quantum mechanical principles rather than classical mechanical principles. For example, a mesoscopic island can be a block of superconducting material (e.g., a portion of a superconducting loop bounded by Josephson junctions) that is sufficiently small to be governed by quantum mechanical principles. Generally, in order for an island to be mesoscopic, it must have dimensions that are in the low micrometer range or smaller. An exemplary mesoscopic island has a width that is 0.2 microns or less, a length of 1.0 micron or less, and a thickness that is 0.2 microns or less.

2.7 State of the Art

Given the above background, there is a need for improved scalable readout mechanisms that can read the state of qubits without introducing a significant source of decoherence. Further, there is a need in the art for methods for controllably entangling the quantum states of qubits.

3. BRIEF DESCRIPTION OF THE DRAWINGS

Figure 6:
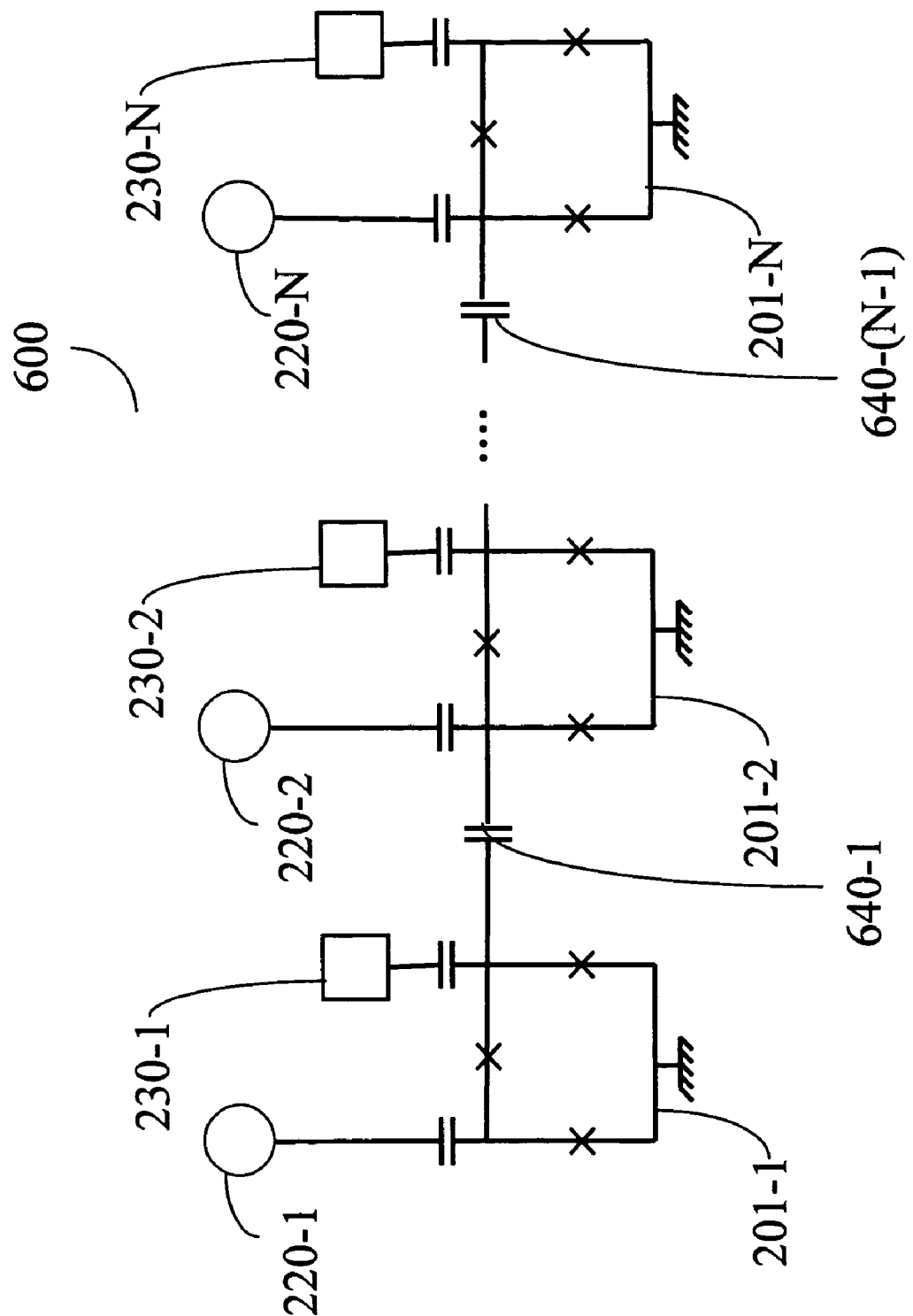

FIG. 6 schematically illustrates an embodiment of the invention for coupling superconducting phase-charge qubits in the charge basis.

Figures 7A, 7B:
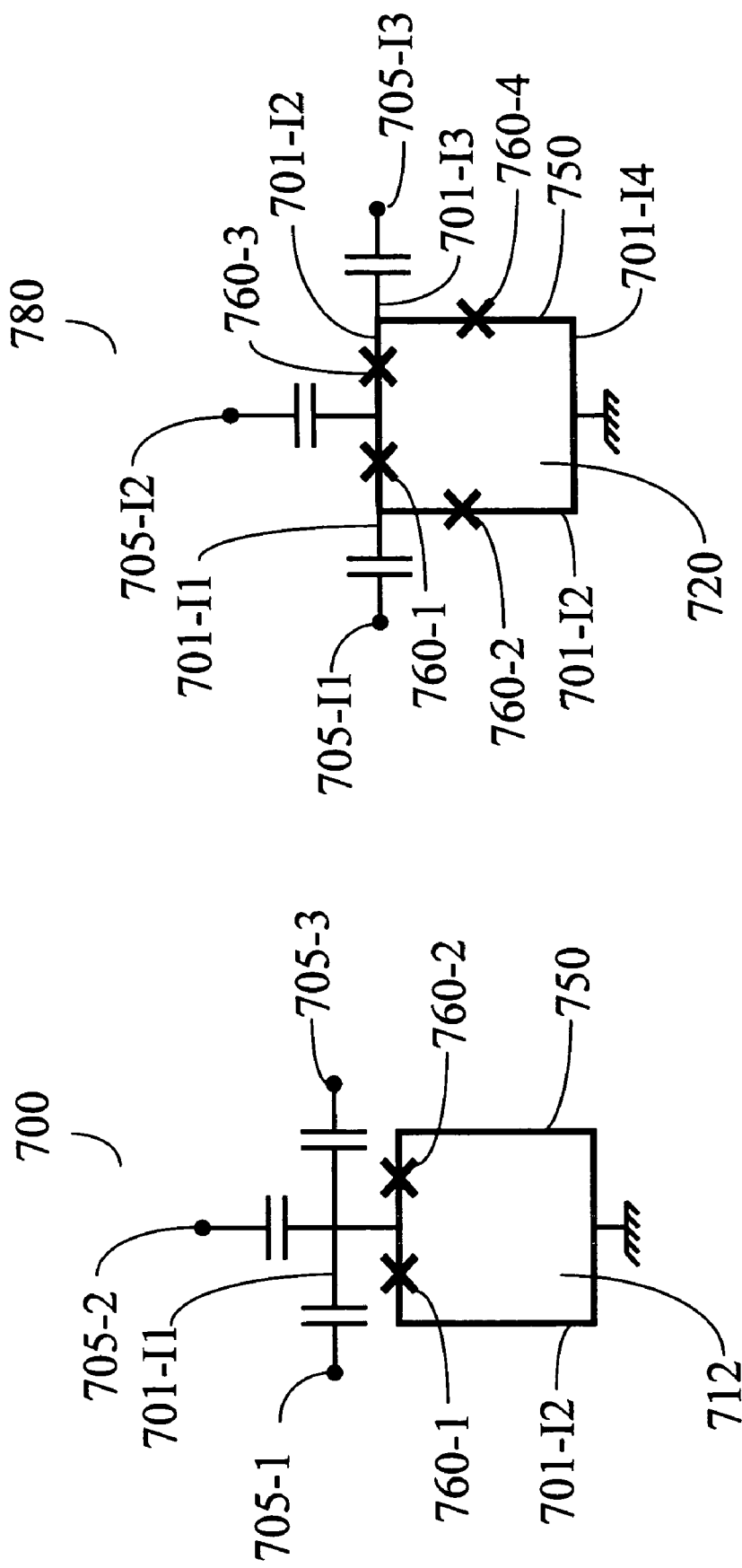

FIG. 7A schematically illustrates a phase-charge qubit comprising a superconducting loop interrupted by two Josephson junctions forming a first island and a second island in accordance with an embodiment of the present invention FIG. 7B illustrates an embodiment of the present invention in which a phase-charge qubit has four Josephson junctions forming four islands in accordance with an embodiment of the present invention.

Like reference numerals refer to corresponding parts throughout the several views of the drawings.

4. SUMMARY OF THE INVENTION

The present invention addresses limitations found in the prior art. First, the present invention provides scalable readout mechanisms for reading out the state of qubits without introducing a significant source of decoherence. Second, the present invention provides systems and methods for entangling the states of qubits in a controllable manner.

A first aspect of the present invention provides a superconducting quantum computing structure comprising a superconducting phase-charge qubit. The superconducting phase-charge qubit comprises at least one island. The superconducting quantum computing structure further comprises a first mechanism for controlling the charge of the phase-charge qubit and a second mechanism for detecting the charge of the phase-charge qubit. The first mechanism and the second mechanism are each capacitively connected to the superconducting phase-charge qubit. In some embodiments, the first mechanism comprises a gate charge. In some instances, this gate charge includes an alternating signal (AC) and a direct signal (DC) component. In some instances, the gate charge applies a voltage with a magnitude between 1 picoVolt and 1 Volt to the superconducting phase-charge qubit. In some embodiments, the first mechanism comprises a gate capacitance coupled to the superconducting phase-charge qubit. In some cases, this gate capacitance is between 1 zeptoFarad (zF) and 100 picoFarads (pF). In some embodiments, the second mechanism comprises an electrometer (e.g., a radio frequency Single Electron Transistor) with a capacitance between 1 zF and 100 pF.

In some embodiments in accordance with the first aspect of the invention, the superconducting phase-charge qubit comprises a superconducting loop interrupted by at least one Josephson junction. In one example, there are at least three Josephson junctions, one of which has different characteristics (e.g., critical Josephson current) than the others. In another example, there are three Josephson junctions in the loop and each junction has a different coupling energy. In some embodiments, the superconducting material used to make the loop is aluminum, niobium, alloys thereof, or any combination thereof. In some embodiments, a Josephson junction in the loop includes an insulating layer.

In some embodiments in accordance with the first aspect of the invention, the superconducting phase-charge qubit comprises a superconducting loop interrupted by a plurality of Josephson junctions. Each adjacent pair of Josephson junctions in the plurality of Josephson junctions defines an island of the at least one island of the superconducting phase-charge qubit. In one example, the first mechanism is coupled to a first island of the phase-charge qubit and the second mechanism is coupled to a different island of the superconducting phase-charge qubit.

Some embodiments in accordance with the first aspect of the invention further comprise a mechanism for biasing the superconducting phase-charge qubit such that the mechanism for biasing the superconducting phase-charge qubit is inductively coupled to the superconducting phase-charge qubit. In some instances, this mechanism for biasing is inductively coupled to the superconducting phase-charge qubit thereby inductively coupling a magnetic field to the superconducting phase-charge qubit. In some instances, the mechanism for biasing is capable of applying a magnetic flux with a magnitude between $0 \cdot \Phi_0$ and $5 \cdot \Phi_0$ to the superconducting phase-charge qubit, where $\Phi_0$ is the flux quantum.

A second aspect of the invention provides a superconducting quantum computing structure comprising (i) a plurality of superconducting phase-charge qubits, such that at least two phase-charge qubits of the plurality of phase-charge qubits share a coupling capacitance, and (ii) a plurality of first mechanisms for controlling the charge of the at least two superconducting phase-charge qubits, wherein the plurality of first mechanisms are capacitively coupled with a corresponding qubit of the at least two superconducting phase-charge qubits. In some embodiments, the at least two superconducting phase-charge qubits form a linear chain. In some embodiments, the coupling capacitance is shared between adjacent phase-charge qubits. In some instances, the coupling capacitance has a value between 1 zF and 100 nanoFarads (nF).

In some embodiments in accordance with the second aspect of the invention, the first mechanism comprises a (i) gate charge or a (ii) gate capacitance that is coupled to each of the at least two superconducting phase-charge qubits. In some instances, the gate charge applies a voltage with a magnitude between 1 picoVolt and 1 Volt to the at least two superconducting phase-charge qubits. Some embodiments further comprise a second mechanism for measuring the charge of at least one of the at least two superconducting phase-charge qubits.

Some embodiments further comprise a mechanism for biasing each of the at least two superconducting phase-charge qubits. This mechanism for biasing is capable of applying a magnetic flux with a magnitude between $0\Phi_0$ and $5\Phi_0$ to each of the plurality of superconducting phase-charge qubits, where $\Phi_0$ is the flux quantum.

A third aspect of the invention provides a method for measuring the state of a superconducting phase-charge qubit comprising (i) tuning a charge of a first island of the superconducting phase-charge qubit and (ii) detecting the charge of the superconducting phase-charge qubit. In some instances, the detecting the charge of the superconducting phase-charge qubit comprises detecting the charge of the first island. In some instances, the detecting the charge of the superconducting phase-charge qubit comprises detecting the charge of an island of said superconducting phase-charge qubit other than the first island. In some embodiments, the tuning the charge of the first island comprises applying a gate charge (e.g., with a magnitude between 1 picoVolt and 1 Volt) to the first island.

A fourth aspect of the invention provides a method for achieving a qubit operation on a superconducting phase-charge qubit in which the charge of an island of the superconducting phase-charge qubit is tuned for a duration $\Delta t$ (e.g., between 0.1 picoseconds and 500 nanoseconds). In some embodiments, this tuning comprises applying a gate charge (e.g., with a magnitude between 1 picoVolt and 1 Volt) to the superconducting phase-charge qubit. In some instances, the gate charge comprises a direct signal component and an alternating signal component. In some embodiments, the alternating signal component has an amplitude of zero and in some embodiments the alternating signal component has a frequency between 400 megaHertz and 50 gigaHertz.

A fifth aspect of the invention provides a method for achieving qubit operations on a superconducting phase-charge qubit in which an external magnetic field is applied to the qubit. In some embodiments, the external magnetic field varies over time with a certain frequency in order to implement a particular type of operation. The frequency of the magnetic field can be comparable to a characteristic frequency of the qubit to which the magnetic field is applied. Accordingly, an embodiment of the present invention provides a $\sigma^x$ operation that comprises applying the varying magnetic field with a predetermined frequency to the qubit. At the same time that the varying magnetic field is applied, an external constant magnetic field applies a half flux quantum ($\Phi_0/2$) of bias to the superconducting phase-charge qubit The varying magnetic field is applied with a strength and for an amount of time that will allow the $\sigma^x$ operation to take place.

In another embodiment of the invention, a $\sigma^z$ operation is applied to the superconducting phase-charge qubit. To effect this operation, the constant external magnetic field is set to a value different from $\Phi_0/2$ so that the qubit states are non-degenerate. No varying magnetic field is applied. The constant external magnetic field is applied for a sufficient amount of time to allow the $\sigma^z$ operation to take place. The amount of time that is required to effect the $\sigma^z$ operation is a function of how far away from $\Phi_0/2$ that the superconducting phase-charge qubit was flux biased.

Another aspect of the invention provides a method for achieving a qubit operation on a superconducting phase-charge qubit. In the method, the charge of a first island of the superconducting phase-charge qubit is tuned for a duration $\Delta t$. In typical embodiments in accordance with this aspect of the invention, the superconducting phase-charge qubit comprises a superconducting loop in which a plurality of Josephson junctions in the superconducting loop define a plurality of islands in the superconducting loop. The plurality of islands include the aforementioned first island. In some embodiments, the tuning comprises applying a gate charge to the superconducting phase-charge qubit. This gate charge can have a direct signal component and an alternating signal component. In some instances the gate charge has a direct signal component and no alternating signal component. In some embodiments, the magnitude of the gate charge is between 1 picoVolt and 1 Volt. In some embodiments, the alternating signal component has a frequency between 400 megaHertz and 50 gigaHertz. In some embodiments, duration $\Delta t$ is between 0.1 picoseconds and 500 nanoseconds.

Another aspect of the invention provides a method for entangling a plurality of superconducting phase-charge qubits. Each superconducting phase-charge qubit in all or a portion of the plurality of superconducting phase-charge qubits comprises a respective superconducting loop interrupted by a plurality of Josephson junctions thereby forming a plurality of islands in the respective superconducting loop. Furthermore each of the plurality of islands includes a first island and a second island. In the method, a bus island is capacitively coupling to each of two or more first islands. Furthermore, the charge of the capacitively coupled two or more first islands is tuned for a duration $\Delta t$. In some embodiments, the method further comprises tuning a readout gate charge that is capacitively coupled to two or more second islands. In some embodiments the tuning of the second islands comprises applying a gate charge to said two or more second islands. In some embodiments, the magnitude of this gate charge is between 1 picoVolt and 1 Volt. In some embodiments, the duration $\Delta t$ is between 10 picoseconds and 10 microseconds or between 1 nanosecond and 500 nanoseconds.

Still another aspect of the invention provides a method for reading out a quantum state of each superconducting phase-charge qubit in a plurality of superconducting phase-charge qubits. In this aspect of the invention, each superconducting phase-charge qubit in all or a portion of the plurality of superconducting phase-charge qubits comprises a respective superconducting loop interrupted by a plurality of Josephson junctions thereby collectively forming a plurality of islands in the respective superconducting loop. In the method, a readout device is capacitively coupled to a first island in each superconducting phase-charge qubit in all or a portion of the plurality of superconducting phase-charge qubits. Then, the charge of each of the capacitively coupled first islands is tuned. Then the charge on each of the capacitively coupled first islands is read out. In some embodiments the method further comprises tuning a gate charge that is capacitively coupled to an island in each superconducting phase-charge qubit in all or a portion of the plurality of superconducting phase-charge qubits. In some embodiments the gate charge is capacitively coupled to the first island in each superconducting phase-charge qubit in said all or the portion of the plurality of superconducting phase-charge qubits. In other embodiments, the gate charge is capacitively coupled to an island other than the first island in each superconducting phase-charge qubit in the plurality of superconducting phase-charge qubits. In some embodiments, the tuning comprises applying a gate charge to each said first island in the plurality of superconducting phase-charge qubits. In some embodiments, the magnitude of the gate charge is between 1 picoVolt and 1 Volt. In some embodiments, the reading out comprises detecting the charge on each said capacitively coupled first island.

Another aspect of the present invention provides a method of quantum computing. In the method, a charge of a first island of a first superconducting phase-charge qubit is tuned for a duration $\Delta t$. The first superconducting phase-charge qubit comprises a superconducting loop in which a plurality of Josephson junctions interrupting the superconducting loop collectively define a plurality of islands in the superconducting loop. The plurality of islands include the first island. The operating point of the first superconducting phase-charge qubit is biased away from a center of a point of computational operation of the first superconducting phase-charge qubit. A gate charge is applied to the first superconducting phase-charge qubit during the biasing. The first superconducting phase-charge qubit is capacitively coupled to a second island of a second superconducting phase-charge qubit when the first island of the first superconducting phase-charge qubit and a first island of the second superconducting phase-charge qubit are each in the charge basis. In some embodiments, the tuning applies a $\sigma^z$ gate operation to the first superconducting phase-charge qubit. In some embodiments, the gate charge includes a direct signal component and an alternating signal component. In some embodiments, the alternating signal component has a frequency ranging between about 400 megaHertz (MHz) and about 50 gigaHertz (GHz). In some embodiments, the gate charge applies a $\sigma^y$ Pauli matrix to the first superconducting phase-charge qubit.

Another aspect of the invention provides a method of quantum computing using a first superconducting phase-charge qubit and a second superconducting phase-charge qubit. In this aspect of the invention, a first gate charge is applied to an island of the first superconducting phase-charge qubit for a duration $t_1$. A second gate charge is applied on an island of the second superconducting phase-charge qubit for a duration $t_2$. The island of the first superconducting phase-charge qubit is capacitively coupled to the island of the second superconducting phase-charge qubit for a duration $t_3$. In some embodiments, the first applying step and the second applying step are performed concurrently such that all or a portion of the duration $t_1$, overlaps with all or a portion of the duration $t_2$. In some embodiments the first applying step and the capacitively coupling step are performed concurrently such that all or a portion of the duration $t_1$, overlaps with all or a portion of the duration $t_3$. In some embodiments, the second applying step and the capacitively coupling step are performed concurrently such that all or a portion of the duration $t_2$ overlaps with all or a portion of the duration $t_3$. In some embodiments, the first applying step, the second applying step and the capacitively coupling step are performed concurrently such that all or a portion of each of the duration $t_1$, the duration $t_2$, and the duration $t_3$ overlap with each other.

Another aspect of the invention provides a method of quantum computing using a first superconducting phase-charge qubit and a second superconducting phase-charge qubit. The method comprises:

(i) applying a first gate charge on a first island of the first superconducting phase-charge qubit for a duration $t_1$ while a second island of the first superconducting phase-qubit remains in a phase basis;

(ii) applying a second gate charge on a first island of the second superconducting phase-charge qubit for a duration $t_2$ while a second island of the second superconducting phase-qubit remains in a phase basis; and (iii) capacitively coupling the first island of the first superconducting phase-charge qubit to the first island of the second superconducting phase-charge qubit for a duration $t_3$. In some embodiments in accordance with this aspect of the invention, the method further comprises reading out the state of the first superconducting phase-charge qubit. In some embodiments, the first charge is removed from the first island of the first superconducting phase-charge qubit during the reading out and the second charge is removed from the first island of the second superconducting phase-charge qubit during the reading out. Still another aspect of the invention provides a superconducting phase-charge qubit comprising a superconducting loop. In this aspect of the invention, each Josephson junction in the plurality of Josephson junctions interrupts the superconducting loop. Each Josephson junction in the plurality of Josephson junctions has a Josephson energy. Furthermore, the superconducting loop comprises a plurality of mesoscopic islands. Each mesoscopic island in the plurality of mesoscopic islands is a portion of the superconducting loop defined by adjacent Josephson junctions in the plurality of Josephson junctions. A smallest Josephson junction in the plurality of Josephson junctions has a Josephson energy that is one quarter of the Josephson energy of a largest Josephson junction of the plurality of Josephson junctions. The superconducting loop has a charging energy that is between one eighth and eight times the Josephson energy of the largest Josephson junction in the plurality of Josephson junctions. In some embodiments, the superconducting loop has a charging energy that is between one quarter and four times the Josephson energy of the largest Josephson junction in the plurality of Josephson junctions. In some embodiments, the superconducting loop has a charging energy that is between one half and two times the Josephson energy of the largest Josephson junction in the plurality of Josephson junctions. In some embodiments, the superconducting phase-charge further comprises a voltage source capacitively coupled to a first mesoscopic island in the plurality of mesoscopic islands. In some embodiments, the superconducting phase-charge further comprises a region of superconducting material galvanically coupling a second island, in the plurality of mesoscopic islands, to ground.

5. DETAILED DESCRIPTION

In accordance with the present invention, a structure and method for detecting and controlling the quantum state of a superconducting phase-charge qubit is described in which the state of the phase-charge qubit can be controllably localized in the phase basis or the charge basis. In some embodiments of the present invention, localization in the charge basis provides a detectable quantity that can be used to measure the state of the phase-charge qubit. In particular, the detectable quantity is the charge of an island of the phase-charge qubit. Furthermore, localization in the charge basis can be used to entangle the states of different qubits in a controllable manner. The phase-charge qubits of the present invention differ from the hybrid charge-phase qubits of Vion et al. The hybrid charge-phase qubit of Vion et al. are in fact charge qubit structures that can operate in the charge or phase regime. See, Vion et al., 2002, Science, 296, 886, which is hereby incorporated by reference in its entirety. In contrast, the phase-charge qubits of the present invention are phase qubit structures that can operate in the charge or phase regime. Embodiments of the present invention operate at temperatures low enough to allow quantum effects to dominate. For example, in some embodiments of the invention, the quantum circuit is operated at 200 milliKelvin or less, 100 milliKelvin or less, or 50 milliKelvin or less.

In accordance with the present invention, a scalable structure and method is proposed for performing measurement and control of a phase-charge qubit Some embodiments of the present invention provide structures and methods for performing phase-charge qubit single-shot readout by taking advantage of the phase-charge uncertainty of superconducting condensates in superconducting materials. Some embodiments of the present invention provide structures and methods for controllably entangling phase-charge qubits.

Figure 1B:
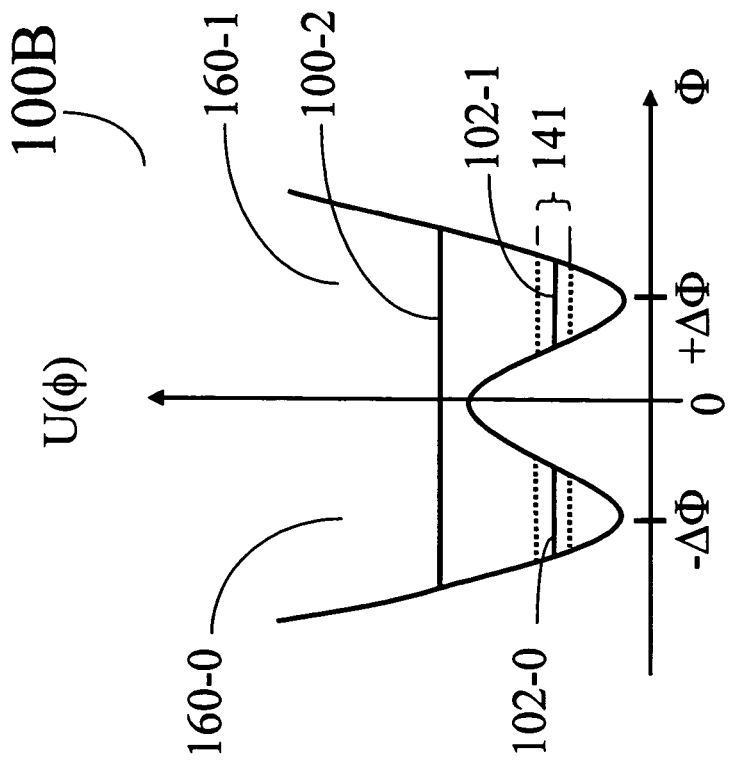
FIG. 1B illustrates a potential energy diagram as a function of phase for a phase qubit in accordance with the prior art.
Figure 1A:
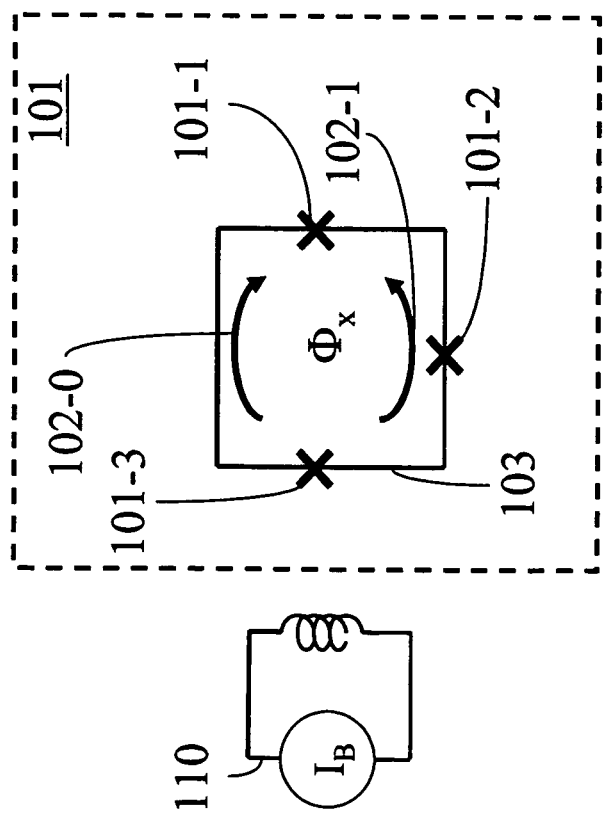
FIG. 1A illustrates a superconducting phase qubit in accordance with the prior art.

Referring to FIG. 1A, during computational operation of a phase qubit, quantum information in the phase qubit is stored as a superposition of phase states. The detectable phase states are typically represented by clockwise 102-0 and counter-clockwise 102-1 supercurrent circulating in loop 103. The clockwise 102-0 and counter-clockwise 102-1 supercurrents respectively represent basis states (phase states) 102-0 and 102-1 of FIG. 1B.

Useful quantum operations can be performed on the quantum information stored in the phase basis. A charge can be applied to an island of the phase qubit, which increases sensitivity of the qubit to the charge basis and permits charge control over the state of the qubit. Then, in accordance with the present invention, manipulation and measurement of the charge of the phase qubit is used for controlling and measuring the information stored in the phase qubit. Using FIG. 1A to illustrate, an island of a phase qubit is that portion of loop 130 that is bounded by a first and second Josephson junction 101. For example, an island of phase qubit 101 can be defined as that portion of loop 130 that is bounded by both Josephson junctions 101-1 and 101-2.

Figure 2:
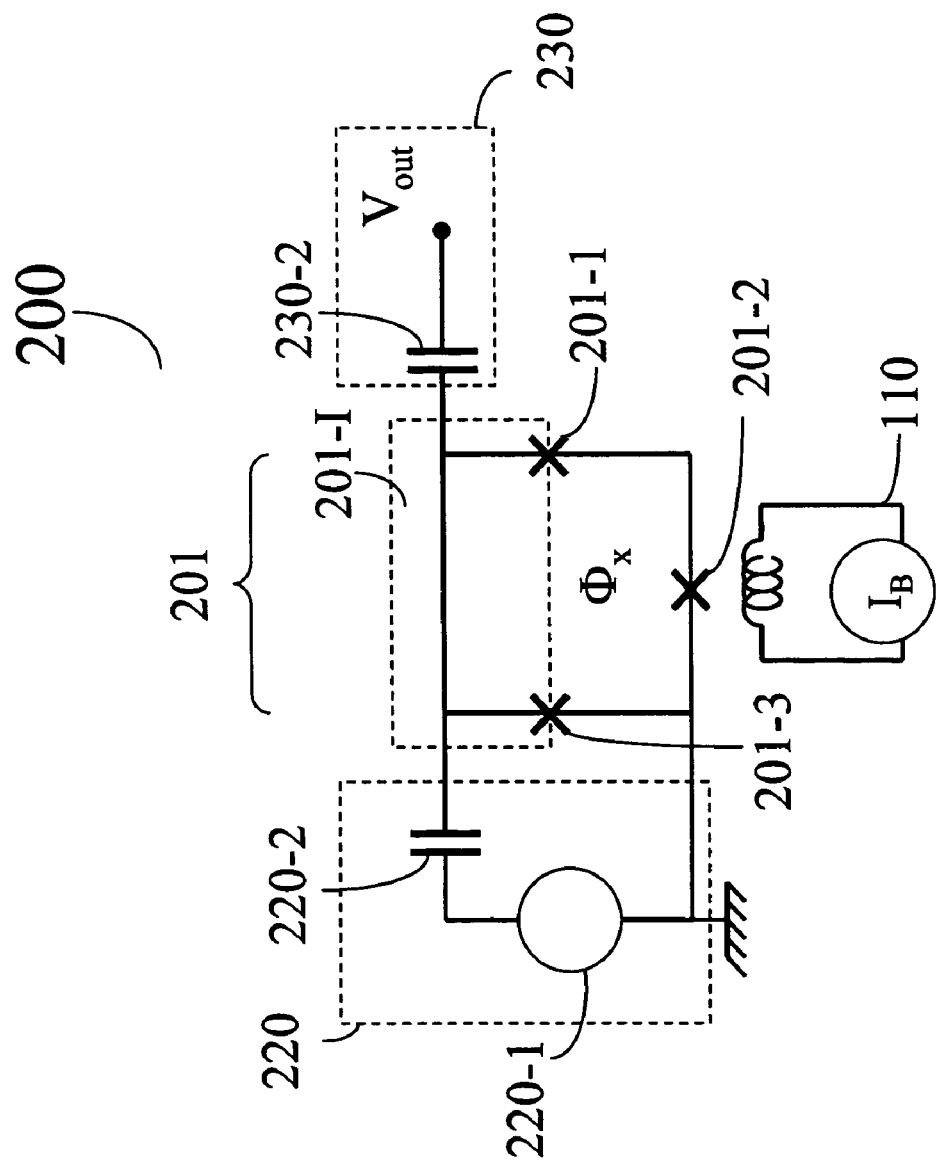
FIG. 2 illustrates an embodiment of the present invention for controlling the charge of a superconducting phase-charge qubit.

FIG. 2 illustrates a system 200 for controlling the charge of the phase-charge qubit and performing a readout. System 200 comprises a phase-charge qubit 201 having three Josephson junctions 201. System 200 further includes a charge control apparatus 220 that is coupled to island 201-I of phase-charge qubit 201 in order to provide a gate charge 220-1 to the island. Here, island 201-I is defined as that portion of phase-charge qubit 201 that is bounded by both Josephson junction 201-1 and 201-3. In one embodiment, gate charge 220-1 is applied in a capacitive manner using a gate capacitor 220-2 that is coupled to island 201-I of phase-charge qubit 201. Capacitor 220-2 can have a capacitance ranging from about 1 zeptoFarad (zF) to about 1 picoFarad (pF). System 200 further includes a bias source 110 that is inductively coupled to phase-charge qubit 201. Bias source 110 is used to thread a magnetic flux $\Phi_x$ through phase-charge qubit 201 to provide control of the state of the phase-charge qubit. In some embodiments of the present invention, one or more of the islands in the phase-charge qubit are mesoscopic in size.

Charge control apparatus 220 can tune the charge of phase-charge qubit 201, and the charge Q on island 201-1 can be detected by a readout apparatus 230 that is capacitively coupled to island 201-I through capacitor 230-2. In some embodiments of the invention, charge control apparatus 220 and readout apparatus 230 are the same. In other words, a readout device is used to control the operating point of phase-charge qubit 201 and selectively detect the charge Q on island 201-I of the phase-charge qubit 201 as necessary. In some embodiments in accordance with this aspect of the invention, a readout apparatus 230 includes a gate charge for tuning the operating point of the apparatus 230. As a result, the gate charge controls the charge of apparatus 230. This charge on apparatus 230 can be capacitively coupled to island 201-I in such a way that tuning the gate charge of apparatus 230 tunes the charge of island 201-I. Thus, in such embodiments, the charge of island 201-I can be controlled directly by readout apparatus 230 and a separate charge control apparatus 220 is not required. In some embodiments of the invention, the capacitive coupling between readout apparatus 230 and island 201-1 of phase-charge qubit 201 ranges from about 1 zF to about 1 pF.

In some embodiments of the invention, voltage is measured in addition to or rather than detecting a charge during qubit quantum state readout. In some embodiments of the invention, the charge Q on island 201-I is detected by measuring the voltage across capacitor 230-2. While not being limited to any particular theory, it is believed that, by measuring the voltage across capacitor 230-2, the expectation value of the charge is measured. The detection of the charge on portions of the qubit, such as island 201-I, by measuring the voltage is consistent with detecting the charge, as the expectation value of charge is related to voltage by the capacitance of capacitor 230-2. In some embodiments of the invention, the capacitance of the entire portion of qubit is accounted for when detecting the charge $<Q>=C_\Sigma V$ on the portion, where V is the voltage across the capacitor, $C_\Sigma$ is the effective capacitance of the portion of the qubit where the charge resides, and $<Q>$ is the expectation value of the charge.

In some embodiments of the invention, voltage is applied to a portion (e.g. island) of the qubit as an equivalent step to manipulating or controlling the charge. In some embodiments of the invention, the charge Q on island 201-I is manipulated by applying a voltage across a capacitor. The effect a capacitively coupled voltage has on the charge of a portion of a qubit depends on the capacitance of the mechanism coupling the qubit to the voltage. In some embodiments, the coupling mechanism is capacitor 230-2. A single unit charge can be induced on the portion of the qubit (e.g., island) by applying a voltage of $V=e/(2C)$, where C is the capacitance of the coupling mechanism. In some embodiments of the invention, the capacitance of the entire portion of the qubit is accounted for when detecting the charge on the portion, where $V=e/(2C_\Sigma)$, where $C_{93}$ is the effective capacitance of the portion of the qubit where the charge resides and e is the elementary charge.

In accordance with the present invention, during computational operation of the phase-charge qubit, information is stored as a superposition of the basis states. The basis states of the phase-charge qubit are typically represented by clockwise and counterclockwise circulating persistent currents, denoted |L> and |R> respectively. The superposition states of the phase-charge qubit, referred to herein as the energy states of the phase-charge qubit, are denoted $(|L>-|R>)/\sqrt{2}$ and $(|L>+|R>)/\sqrt{2}$. In some embodiments of the present invention, measurement of the phase-charge qubit in the charge basis yields information about the energy state of the phase-charge qubit.

In accordance with an embodiment of the present invention, a method for detecting the charge state of phase-charge qubit 201 comprises tuning gate charge 220-1 to a first level, such that the gate charge 220-1 is applied to island 201-I of phase-charge qubit 201, and detecting the charge Q of island 201-I. The charge Q on island 201-I of phase-charge qubit 201 will depend on the energy state of the phase-charge qubit when a gate charge 220-1 tunes the charge of island 201-I away from zero. For example, consider the case in which the phase of qubit 201 just before application of gate charge 220-1 was purely in a first energy state of qubit 201 (e.g., $(|L>-|R>)/\sqrt{2}$) then upon application of gate charge 220-1 island 201-I of qubit 201 will adopt a first charge state that is characteristic of this first energy state. If, on the other hand, the phase of qubit 201 just before application of gate charge 220-1 is purely in a second energy state of qubit 201 (e.g., $(|L>+|R>)/\sqrt{2}$) then, upon application of charge 220-1, island 201-I of qubit 201 will adopt a second charge state that is characteristic of the second energy state. The first and second charge states are known beforehand and can be characterized arbitrarily or by modeling of the system or by quantum process tomography. For examples of quantum process tomography, see D'Ariano and Lo Presti, 2001, Phys. Rev. Lett. 86, pp. 4195-4198; Martini et al., 2002, arXiv:quant-ph/0210210 v1; and Boulant et al., 2002, arXiv: quant-ph/0211046 v1, which are all hereby incorporated by reference in their entireties.

In this way, the charge on island 201-I represents an information state basis where the energy states of the qubit are represented by differing average numbers of Cooper-pair charges on island 201-I. In some embodiments, the phase-charge qubit is in a superposition of energy states just before the application of gate charge 220-1. In such embodiments, measurement of island 201-I of qubit 201 will collapse the superposition into one of the two possible energy states according to the probability amplitudes of the respective energy states. For example, consider the case in which the phase-charge qubit is in a superposition of energy states such that there is a 73 percent chance that the phase-charge qubit will collapse into the first energy state and a corresponding 27 percent chance that the phase-charge qubit will collapse into the second energy state upon readout. Measurement of island 201-I of qubit 201 will collapse the superposition of basis states into either the first energy state (with a 73% chance) or the second energy states (with a 27% chance). Thus, the apparatus and methods of the present invention can be used to carry out quantum calculations, the results of which are then read out as charge states, where each charge state represents a collapse of the wave function of a corresponding qubit into one of two energy states. In this way, the apparatus and methods can be used to read out the results of a quantum calculation. More elaboration on quantum measurement and quantum calculations can be found in Nielsen and Chuang, 2000, "Quantum Computation and Quantum Information," Cambridge University Press, Cambridge, pp. 83-94, which is hereby incorporated by reference in its entirety.

In more detail, a gate charge 220-1 coupled to phase-charge qubit 201 has a quasicharge or effective charge $Q_g=C_gV_g$, where $Q_g$ is the gate charge, $C_g$ is the gate capacitance, and $V_g$ is the gate voltage. In some embodiments of the invention, the charge $Q_q$ on island 201-I of phase-charge qubit 201 depends on the derivative of the energy of the phase-charge qubit 201 with respect to the gate charge:

$$Q_q = Q_g - C_\Sigma \frac{dE}{dQ_g}, \quad (1)$$

where $C_\Sigma=C_1+C_g[C_2^{-1}+(C_3+C_g)^{-1}]^{-1}$ is the effective capacitance and $C_i$ are the respective embodiments of the present invention, the energy derivative is zero when gate charge $Q_g=0,\mathrm{Mod}(2e)$, where e is the charge of an electron. At $Q_g=e/2$ a maximum difference exists between $Q_1$, the charge of the first excited state, and $Q_0$, the charge of the ground state of flux qubit 201. Therefore, in accordance with the present invention, the phase state of the phase-charge qubit can be correlated with the charge of the phase-charge qubit and can be directly measured by tuning a gate charge and detecting the charge Q of the phase-charge qubit.

In some embodiments of the present invention, the charging energy $E_C$ of a Josephson junction in the phase-charge qubit is comparable to the Josephson energy $E_J$ of the junction. The charging energy of a Josephson junction is defined as $e^2/(2C)$, where C is the capacitance of the largest Josephson junction in the phase-charge qubit. The ratio between the charging energy $E_c$ and the Josephson energy $E_J$ of a Josephson junction, which determines whether the junction is operating in the phase or charge regime, can range between about 0.01 and about 10. In some embodiments, $E_c/E_J$ ranges from about 0.05 to about 0.5. A lower ratio indicates that the junction is further into the phase regime. In some embodiments of the present invention, the Josephson energy of a Josephson junction in the phase-charge qubit is between 0.6 μeV and 660 μeV, between 60 μeV and 400 μeV, or between 100 μeV and 500 μeV. In some embodiments of the present invention, the Josephson energy $E_J$ of a Josephson junction in the phase-charge qubit is 112 μeV.

In some embodiments of the present invention, the coefficient α is no longer sufficient to describe the ratio of the critical current of the respective Josephson junctions. Each Josephson junction in the phase-charge qubit may have a different value. The critical current of a Josephson junction is the current through the junction at which the junction no longer carries a DC supercurrent. In some embodiments of the present invention, the critical current, and thereby the Josephson energy ($E_J=(\hbar/2e)I_C$), of each junction may have a unique value, or it may a value equivalent to another Josephson junction in the same phase-charge qubit. In some embodiments of the present invention, the critical currents of two or more Josephson junctions are the same. In some embodiments of the present invention, the critical currents of three or more Josephson junctions are the same. In some embodiments of the present invention, the critical currents of all but one Josephson junctions are the same. In some embodiments of the present invention, the critical currents of all Josephson junctions are the same.

In some embodiments of the present invention, the coefficient α is used to characterize the Josephson energy of a Josephson junction in the phase-charge qubit relative to Josephson energy of all the other Josephson junctions in the qubit, some of the other Josephson junctions in the qubit, or one of the other Josephson junctions in the qubit Thus, for example, the term α is the ratio between the critical current of junction 201-1 and the critical current of junction 201-3. In some embodiments, it is necessary to assign multiple coefficients $\alpha_{p,q}$ where p, q are appropriately chosen indices.

In embodiments of the present invention, the coefficient α may assume any value. In embodiments of the present invention, the coefficient α is restricted to a limited range to simplify calculations, and phase-charge qubit design. In some embodiments, α ranges from 0.04 to 25. In some embodiments, α ranges from 0.05 to 18. In some embodiments, α ranges from 0.06 to 15. In some embodiments, α ranges from 0.25 to 4. In some embodiments, α ranges from 0.5 to 2. In some embodiments, α is 0.71. In some embodiments, α is 0.9.

In some embodiments of the present invention, the area defined by the inner perimeter of each qubit 201 is between 0.05 $\mu m^2$ and 250,000 $\mu m^2$. In some embodiments of the present invention, the area defined by the inner perimeter of each qubit 201 is between 0.1 $\mu m^2$ and 250,000 $\mu m^2$. In some embodiments of the present invention, the area defined by the inner perimeter of each qubit 201 is between 0.5 $\mu m^2$ and 150 $\mu m^2$. In some embodiments of the present invention, the area defined by the inner perimeter of each qubit 201 is between 0.5 $\mu m^2$ and 2.25 $\mu m^2$. In an embodiment of the present invention, the area defined by the inner perimeter of a qubit 201 is 1 $\mu m^2$. In some embodiments of the present invention, the area defined by the inner perimeter of each qubit 201 has a lower bound that is determined by the critical field of niobium or aluminum.

In accordance with an embodiment of the present invention, the charge of the phase-charge qubit is detected using a electrometer device. Electrometers include radio-frequency single electron transistors (rf-SETs) or other types of SETs including superconducting SETs or SSETs. Electrometers useful for embodiments of the invention can have sensitivities ranging from $1 \times 10^{-6}$ e/$\sqrt{Hz}$ to $1 \times 10^{-2}$ e/$\sqrt{Hz}$. Electrometers satisfying these requirements are well known in the art and have been used for measuring the state of charge qubits. See, for example, Pashkin et al., 2003, Nature 421, 823; Lehnert et al., 2003, Physical Review Letters 90, 027002; and Astafiev et al., 2004 "Single-shot measurement of the Josephson charge qubit," LANL preprint server, cond-mat/0402619, which are hereby incorporated by reference in their entireties.

Figure 3:
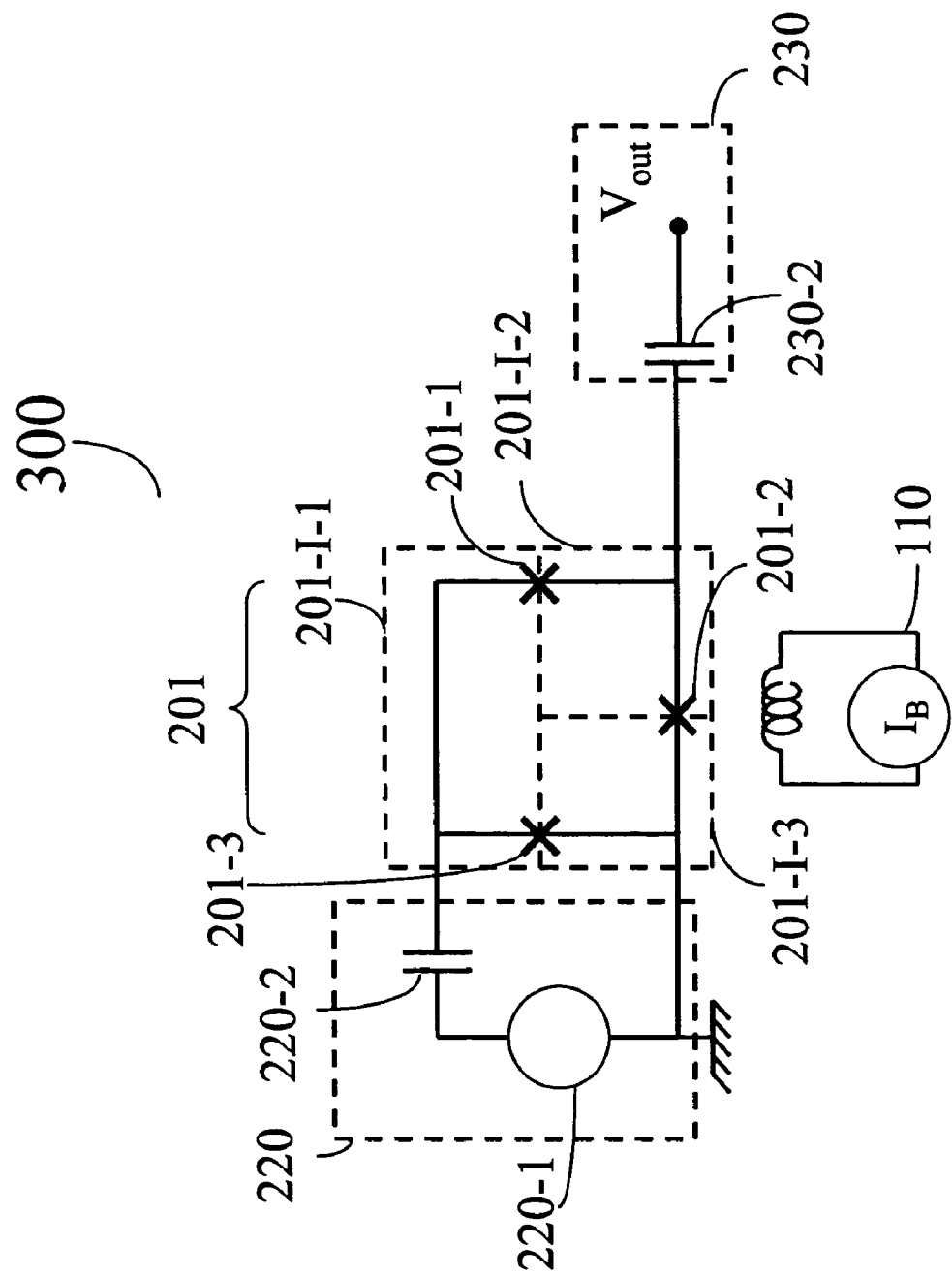
FIG. 3 illustrates another embodiment of the present invention for controlling the charge of a superconducting phase-charge qubit.

FIG. 3 illustrates an embodiment of the present invention 300 having a charge control apparatus 220 connected to an island 201-I-1 (defined by Josephson junctions 201-1 and 201-3), and a readout apparatus 230 connected to a different island 201-I-2 (defined by Josephson junctions 201-1 and 201-2). In accordance with the present invention, the charge of one or more of the phase-charge qubit islands 201-I-1, 201-I-2, or 201-I-3 depends on the phase state when a gate charge is applied to any one of the phase-charge qubit islands. As illustrated in FIG. 3, phase-charge qubit 201 includes islands 201-I-1, 201-I-2, and 201-1-3. A gate charge 220-1 can be applied to island 201-I-1, and the charge of a second island (eg., 201-I-2) can be measured using readout apparatus 230. In some embodiments of the present invention, charge control apparatus 220 and readout apparatus 230 connect to any island of phase-charge qubit 201. Thus, the present invention is not limited to embodiments in which the charge control apparatus 220 and readout apparatus 230 are connected to the same island. In fact, in some embodiments, charge control apparatus 220 and readout apparatus 230 are connected to different islands.

Exemplary Phase-Charge Qubit Embodiments

Phase-charge qubits are similar to phase qubits with the exception that phase-charge qubits can be operated in either the phase regime or charge regime. A phase-charge qubit comprises a superconducting loop interrupted by two or more Josephson junctions such that the Josephson junction interruptions isolate islands in the loop. Quantum information is controlled in the phase and charge basis of such qubits. The materials and manufacturing methods used to make phase-charge qubits, including the material used to make the substrate and the materials used to make the superconducting loop and Josephson junctions of such phase-charge qubits, is the same as the materials used to make phase qubits set forth above in conjunction with FIG. 1. Furthermore, unless otherwise noted, the dimensions and specifications of the superconducting loop and Josephson junctions of such phase-charge qubits are the same as the dimensions and specifications of the corresponding elements of phase qubits set forth above in conjunction with FIG. 1.

In some embodiments, a phase-charge qubit has a superconducting loop interrupted by two or more Josephson junctions thereby defining two or more islands in the superconducting loop. One of the islands (the control island) is used for controlling the quantum state of the phase-charge qubit and for entangling with the quantum state of other phase-charge qubits. Another of the islands is grounded. In some embodiments, the control island interfaces with a gate charge. A gate charge is any mechanism capable of reading out the qubit state. The control island also interfaces with a mechanism for coupling to other phase-charge qubits in the charge-basis.

FIG. 7A schematically illustrates a system 700 comprising a phase-charge qubit 712. Qubit 712 comprises a superconducting loop 750 interrupted by two Josephson junctions 760 forming islands 701-I1 and 701-I2. Island 701-I2 is capacitively connected to ground. Island 701-I1 is capacitively connected to leads 705-1, 705-2, and 705-3. Leads 705 can be used for purposes such as applying a gate charge, measuring the state of phase-charge qubit 712, coupling to a bus or to other phase-charge qubits in the quantum register, or any combination of such purposes. In some embodiments, there are more or less leads 705 than the number of leads depicted in FIG. 7A.

Referring to FIG. 7B, in some embodiments of the present invention, a system 780 comprising a phase-charge qubit 720 has four Josephson junctions 760 in a loop 750, thereby forming four islands 701 in the loop 750. The first, second, and third islands 701 are used for controlling and interacting with the quantum state, while the fourth island (701-I4) is grounded. Referring to FIG. 7B, in some embodiments, island 701-I2, the grounded island, is used for measuring the state of phase-charge qubit 701 and can also be used for applying a gate charge. Phase-charge qubit 720 can be part of a quantum register containing a plurality of qubits. In such quantum registers, a first lead 705-I1 and a third lead 705-I3 can be used to couple phase-charge qubit 720 to other phase-charge qubits. The leads 705 are not restricted to be in the coupling configuration in the manner described previously, but rather can be coupled to any one of a gate charge, readout mechanism, or coupling mechanism, or any combination thereof. For example, in some embodiments, a quantum register can use a bus coupling scheme or a nearest neighbor coupling scheme.

Phase-charge qubits can have two or more Josephson junctions interrupting a superconducting loop. Examples of phase-charge qubits in which the superconducting loop has two (FIG. 7A) and four (FIG. 7B) Josephson junctions has been presented. In other embodiments not illustrated in FIG. 7, each phase-charge Josephson junction has three, five, six, seven, or more than seven Josephson junctions interrupting a superconducting loop. In all such embodiments of a phase-charge qubit, one or more of the islands of the phase-charge qubit is directly connected to ground.

Coupling Phase-Charge Qubits Using the Charge Basis

Figure 4:
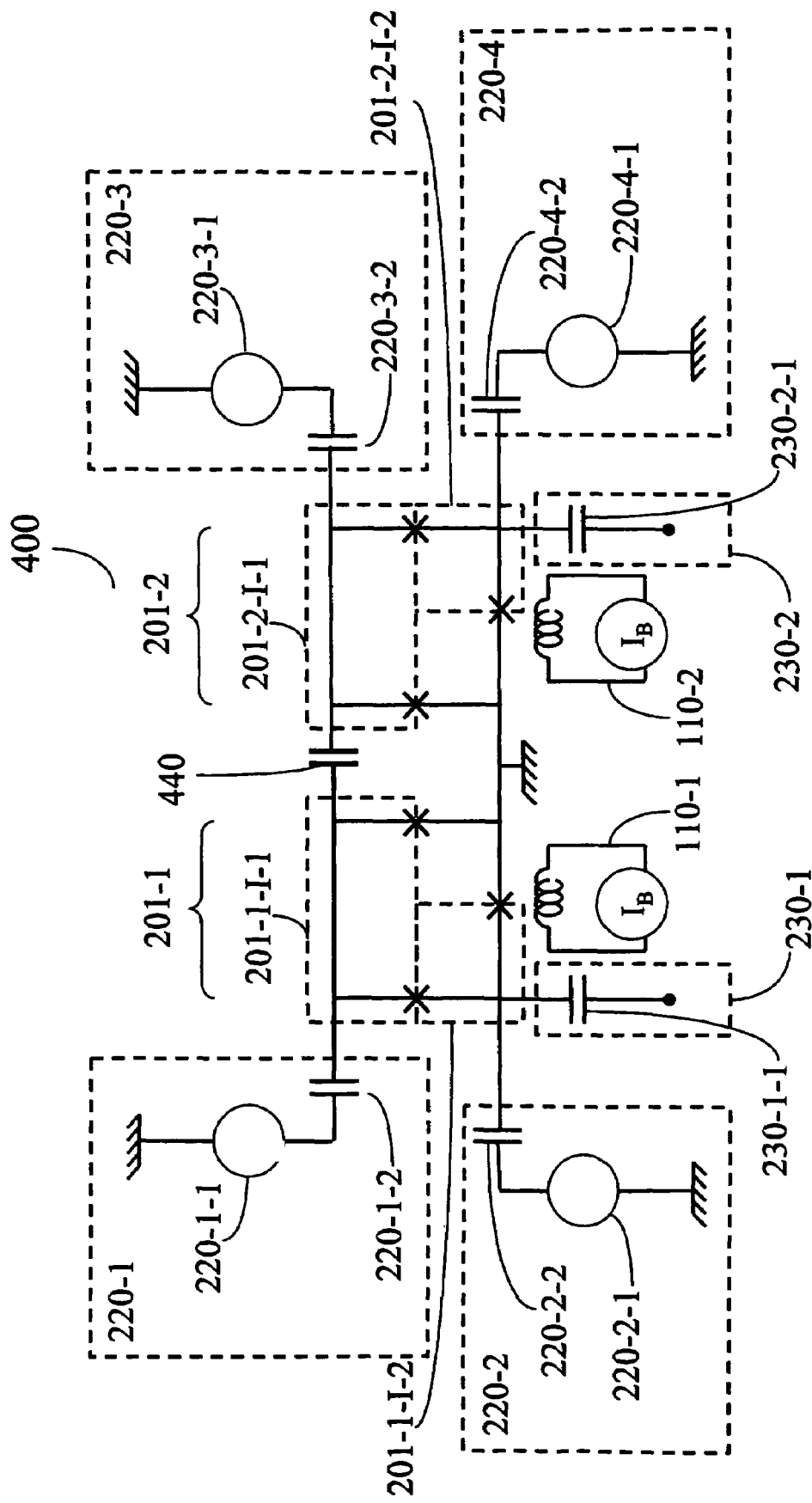
FIG. 4 illustrates an embodiment of the present invention for coupling phase-charge qubits in the charge basis.

FIG. 4 illustrates a structure 400 for controllably coupling a first phase-charge qubit 201-1 and a second phase-charge qubit 201-2, as well as readout apparatus 230-1 and 230-2 for phase-charge qubit 201-1 and 201-2, respectively. Structure 400 comprises a first charge control apparatus 220-1 and a second charge control apparatus 220-2 capacitively connected to phase-charge qubit 201-1, plus a third charge control apparatus 220-3 and a fourth charge control apparatus 220-4 capacitively connected to phase-charge qubit 201-2. Structure 400 has a bias source 110-1 for applying a flux bias to qubit 201-1 and a bias source 110-2 for applying a flux bias to qubit 201-2.

Phase-charge qubits 201-1 and 201-2 are capacitively connected to each other by capacitor 440. Despite the capacitive connection between the first and second phase-charge qubits, quantum information stored in the phase basis of one of the phase-charge qubits 201 will not affect or become entangled with quantum information stored in the phase basis of the other phase-charge qubit 201 unless a gate charge is introduced onto an island in each of the phase-charge qubits. The introduction of a gate charge onto an island places that island in the charge basis.

Charge control apparatus 220-1-1 and 220-2-1 can respectively tune the charge of island 201-1-I-1 and island 201-1-I-2 of phase-charge qubit 201-1. System 400 further includes charge control apparatus 220-3-1 and 220-4-1 that can respectively tune the charge of island 201-2-I-1 and island 201-2-I-2 of phase-charge qubit 201-2. Changing the charge of a phase-charge qubit 201 induces a charge on the phase-charge qubit as a function of the energy state of the phase-charge qubit and hence causes the quantum information stored by the phase-charge qubit 201 to become sensitive to the charge basis.

In accordance with the present invention, the capacitive connection 440 between phase-charge qubits 201 permits charge to interact between islands 201-1-I-1 and 201-2-I-1 of the phase-charge qubits. The quantum information in the phase-charge qubits 201 can be controllably tuned to the charge basis. When in the charge basis, the charge in one of the phase-charge qubits 201 will affect the charge in the other phase-charge qubit 201 thereby entangling the quantum information between the two phase-charge qubits. The capacitive connection 440 between the phase-charge qubits 201 prevents the phase of the phase-charge qubits 201 from interacting but does permit the charge of the phase-charge qubits to interact. Charge control apparatus 220-1-1 and 220-3-1 can then remove the charge sensitivity, thereby removing the charge from islands 201-1-I-1 and 201-2-I-1 of phase-charge qubits 201 and thereby restoring quantum information in phase-charge qubits 201 to the phase basis (i.e. restoring islands 201-1-I-1 and 201-2-I-1 to the phase basis) but leaving their quantum states entangled. In some embodiments of the present invention, phase-charge qubits 201 are placed sufficiently far apart that flux trapped in either of the two qubits does not affect the quantum state in the other of the qubits even when the qubits are in the charge basis. In other embodiments, described in more detail below, the flux trapped in one qubit does in fact inductively affect the quantum state of a proximate phase-charge qubit when the proximate phase-charge qubit is in the charge basis.

In an embodiment of the present invention, the coupling capacitance 440 has a value such that, when a gate charge 220 is applied to a first of the phase-charge qubits 201 but not to the second of the phase-charge qubits, the second phase-charge qubit is not affected. In some embodiments of the present invention, coupling capacitance 440 ranges from about 1 zF to about 100 nanoFarads (nF).

Now that a structure for controllably coupling a first phase-charge qubit 201-1 and a second phase-charge qubit 201-2 has been described in conjunction with FIG. 4, a method for controllably entangling phase-charge qubit 201-1 and second phase-charge qubit 201-2 and then selectively reading out the quantum state of each of the phase-charge qubits will be described in conjunction with the timing diagram given in Table 1.

TABLE 1

Timing diagram for selective entanglement and readout of phase-charge qubits

| Time step | 201-1-I-2 | 201-1-I-1 | 201-2-I-1 | 201-2-I-2 |
|---|---|---|---|---|
| 0 | gate charge = 0 | gate charge = 0 | gate charge = 0 | gate charge = 0 |
| 1 | gate charge = 0 | gate charge ≠ 0 | gate charge ≠ 0 | gate charge = 0 |
| 2 | gate charge ≠ 0 | gate charge = 0 | gate charge = 0 | gate charge ≠ 0 |

In time step $T_0$, each of the islands in phase-charge qubits 201-1 and 201-2 have no gate charge applied to them. They can therefore be described as being in the phase basis. As such, the two phase-charge qubits evolve independent of one another. In other words, during time step $T_0$, the quantum states of qubits 201-1 and 201-2 are not entangled.

In time step $T_1$, the entanglement step, gate charge 220-1-1 is tuned to a value such that the charge of island 201-1-I-1 depends on the energy state of island 201-1-I-1. In other words, gate charge 220-1-1 is tuned such that island 201-1-I-1 is transitioned to the charge basis. Furthermore, gate charge 220-3-1 is tuned such that the charge of island 201-2-I-1 depends on the energy state of island 201-2-I-1. In other words, gate charge 220-3-1 is tuned such that island 201-2-I-1 is transitioned to the charge basis. Gate voltages 220-1-1 and 220-3-1 are maintained for a period of time. This causes islands 201-1-I-1 and 201-2-I-1 to remain in the charge basis and thereby causes their quantum states to become entangled. The magnitude of gate voltages 220-1-1 and 220-3-1 during time step $T_1$ is device dependent, but can range from 1 picoVolt to 1 Volt. In some embodiments of the present invention, the duration of time step $T_1$ (the entanglement step) is between 10 picosecond (ps) and 10 microseconds (μs). In some embodiments of the present invention, the duration of time step $T_1$ is between 1 nanosecond (ns) and 500 ns. During time step $T_1$, islands 201-1-I-2 and 201-2-I-2 are kept in the phase basis as illustrated in Table 1. This keeps phase-charge qubits 201 from being read out during time step $T_1$ and therefore limits decoherence of the phase-charge qubits. In an embodiment of the present invention, maximal entanglement occurs when the gate charges on islands 201-1-I-1 and 201-2-I-1 are each respectively about one quarter of the dimensionless gate charge. This can be expressed explicitly as $n_1=n_2=\frac{1}{4}$, where $n_1$ and $n_2$ are the gate charges on islands 201-1-I-1 and 201-2-I-1. Here, $n_{1,2}=V_{1g,2g}C_{1g,2g}/2e$, where e is the elementary charge, $V_{1g,2g}$ is the voltage applied to islands 201-1-I-1, and 201-2-I-1, and $C_{1g,2g}$ is the capacitance to islands 201-1-I-1 and 201-2-I-1.

In optional time step $T_2$, a readout apparatus is connected to an island that is not used for entangling the qubits. For example, readout apparatus 230-1 can be connected to island 201-1-I-2 and readout apparatus 230-2 can be connected to island 201-2-I-2, as illustrated in FIG. 4. To readout qubit 201-1, gate charge 220-2-1 (lower left hand corner of FIG. 4) is used to tune island 201-1-I-2 to the charge basis. Once island 201-1-I-2 is in the charge basis, readout apparatus 230-1 can be used to measure the state dependent charge on island 201-1-I-2. Correspondingly, to read out qubit 201-2, gate charge 220-4-1 is used to tune island 201-2-I-2 to the charge basis. Once island 201-2-I-2 is in the charge basis, readout apparatus 230-2 can be used to measure the state dependent charge on island 201-2-I-2. During step $T_2$, gate voltages 220-1-1 and 220-3-1 can be used to tune the respective charge states of islands 201-1-I-1 and 201-2-I-1 to the phase basis so that entangling does not occur between these islands during read out. Once time step $T_0$, $T_1$ and, optionally $T_2$, have been completed, the apparatus can be used to perform subsequent computations as desired. For example, any one or more of time steps $T_0$, $T_1$, and optionally $T_2$, can be repeated. In addition, the order of these steps can change, and other operations, such as single qubit operations, can be performed between these times steps.

Coupling a Plurality of Phase-Charge Qubits

Figure 5:
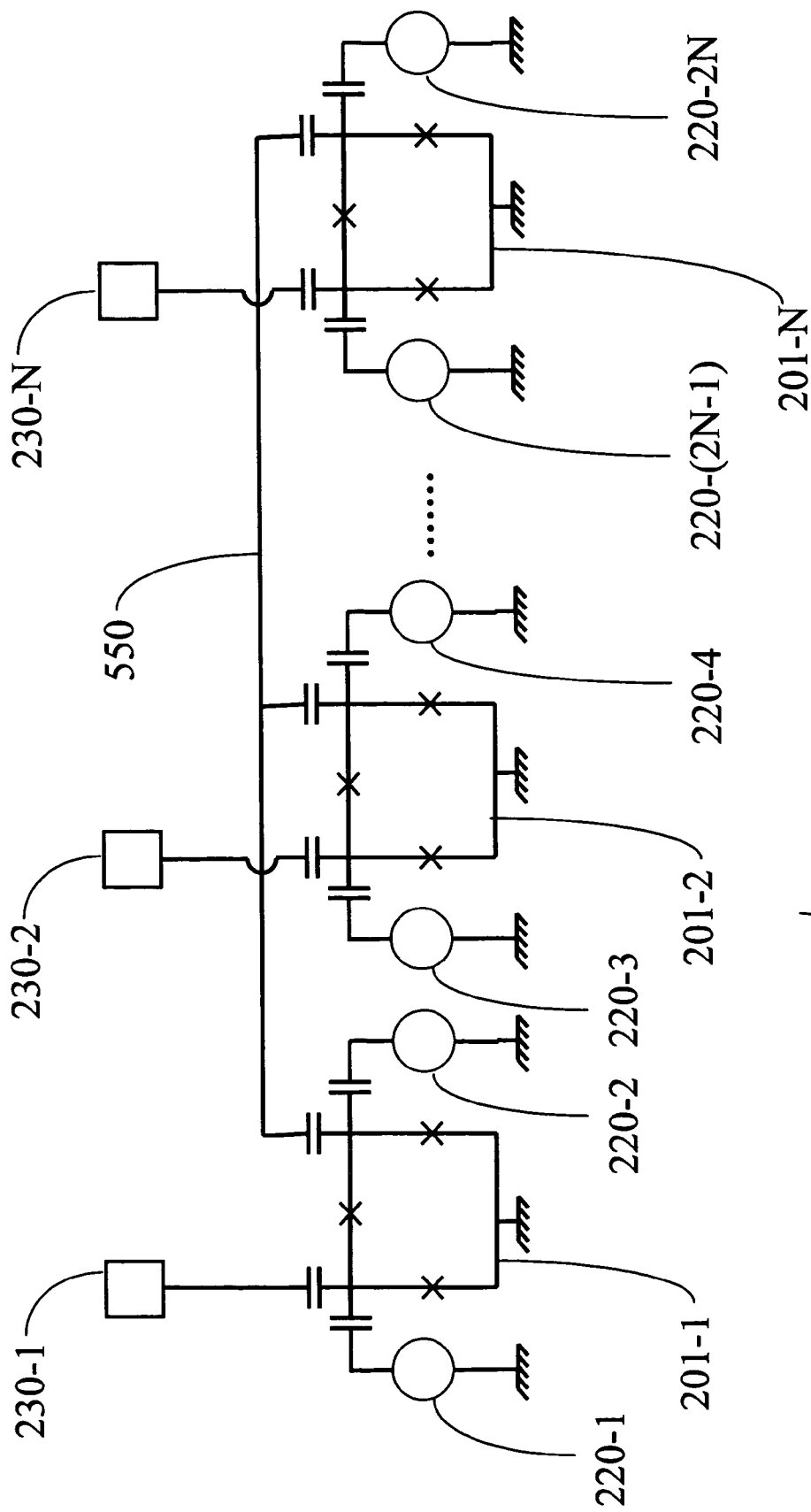
FIG. 5 illustrates an embodiment of the present invention for coupling phase-charge qubits in the charge basis using a bus scheme.

FIG. 5 illustrates a structure 500 for controllably coupling and reading out a plurality of phase-charge qubits 201. Structure 500 comprises a plurality of qubits N, labeled from 201-1 through to 201-N. In some embodiments, N is greater than 2. In some embodiments, N is between 2 and 10,000. In some embodiments, N is a number less than 10,000, less than 15,000, or less than 20,000.

Each phase-charge qubit 201 has one island capacitively coupled with a bus island 550 and another island capacitively coupled to a readout apparatus 230. Structure 500 additionally comprises gate voltages 220-(2i-1), where i is the qubit label in the range from 1 to N, that control the charge on the corresponding qubit's readout island and gate charge 220-2i that control the charge on the corresponding qubit's coupling island. Although not shown in FIG. 5, in some embodiments of the present invention, phase-charge qubits 201-1 through 201-N further include a flux bias apparatus that is illustrated as bias 110 in FIGS. 1 through 4.

In accordance with an embodiment of the present invention, a method for entangling the state of a first phase-charge qubit 201-L and a second phase-charge qubit 201-M (entangling qubits), where L and M are independent integers between and including 1 and N, and where L and M are not necessarily successive integers meaning that there is no requirement that qubit 201-L and 201-M be adjacent, comprises tuning gate voltages 220-2L and 220-2M (entangling gate voltages) that correspond to the qubits 201-L and 201-M such that the charge of the coupling islands on the entangling qubits (qubits 201-L and 201-M) depends on the phase information contained in qubits 201-L and 201-M. In other words, gate voltages 220-2L and 220-2M are used to transition the coupling islands on qubits 201-L and 201-M from the phase regime to the charge regime. These gate voltages are maintained for a sufficient period of time to cause the quantum states of qubits 201-L and 201-M to become entangled. In some embodiments of the present invention, gate voltages 220-J, where J represents each integer between 1 and 2N other than the integers 2L and 2M, for the non-entangling qubits are tuned so that the effective charge on the coupling islands in the non-entangling qubits is small enough to prevent the non-entangling qubits from interacting with bus island 550. In some embodiments of the present invention two or more phase-charge qubits 201 are coupled to bus island 550 simultaneously using the method described above.

In accordance with an embodiment of the present invention, in order to inhibit readout from occurring during qubit entanglement, gate voltages 220-(2L-1) and 220-(2M-1) are tuned to prevent a state dependent charge from being detectable by the respective readout apparatus 230. In practice, this means that, during the entanglement time period in such embodiments, gate voltages 220-(2L-1) and 220-(2M-1) are tuned such that the islands on qubits 201-L and 201-M that are both respectively coupled to gate voltages 220-(2L-1) and 220-(2M-1) and to measurement devices 230 (readout islands), are transitioned to the phase regime.

In accordance with an embodiment of the present invention, a method for reading the state of a number M of phase-charge qubits 201 in parallel comprises tuning gate charges 220-(2i-1), where i is a label for the qubits and ranges from 1 to N, thus making the charge of the readout islands on the M qubits to be read out depend on the energy state contained therein. In other words, these readout islands are transitioned to the charge regime. Once transitioned to the charge basis, the readout islands on the M qubits are read out using readout apparatus 230. In order to inhibit undesirable coupling during the readout process, the gate charge 220-i on the coupling islands of the M phase-charge qubits is tuned to prevent a state dependent charge from coupling to bus island 550. In other words, gate charge 220-i is used to transition the coupling islands to the phase regime.

Universal Quantum Computing

In accordance with an embodiment of the present invention, the phase-charge qubit is capable of performing universal quantum computation. Universal quantum computation requires a minimum set of fundamental qubit operators, such that any quantum logic can be generated from that set of operators. Requirements for universal quantum computing are known and typically include a controllable 2-qubit gate and a set of two single qubit operations, such as those in the $\sigma^z, \sigma^x$, or $\sigma^y$ Pauli matrix group, for example. For a two quantum state system, including qubits, the Pauli operators are:

$$\sigma^X = \begin{pmatrix} 0 & 1 \\ 1 & 0 \end{pmatrix}$$

$$\sigma^Y = \begin{pmatrix} 0 & -i \\ i & 0 \end{pmatrix}, \text{ and}$$

$$\sigma^Z = \begin{pmatrix} 1 & 0 \\ 0 & -1 \end{pmatrix}.$$

See, for example, Nielsen and Chuang, *Quantum Computation and Quantum Information*, Cambridge University Press (2000), p.65. See also, DiVincenzo in Braunstein and Lo, *Scalable Quantum Computers*, First Edition, 2001, Wiley-VCH Verlag GmbH, Berlin, Federal Republic of Germany, each of which is hereby incorporated by reference in its entirety.

Single qubit operations can be implemented on phase-charge qubits 201 using a magnetic field that is inductively coupled to such phase-charge qubits (an inductively coupled magnetic field). In some embodiments, such a magnetic field has a direct signal component (DC) and an alternating signal (AC) component. In some instances, the amplitude of the AC component can be zero. In other words, the single qubit operations are implemented using just the direct signal (DC) in instances where the amplitude of the AC component is zero. Using an inductively coupled magnetic field, the $\sigma^z$ operation can be implemented by changing the DC bias for a period of time $\Delta t_z$. Similarly, a $\sigma^x$ operation can be implemented by applying a high frequency AC bias for a period of time $\Delta t_x$, wherein the AC bias has a frequency that coincides with the energy splitting $\Delta$ of the phase-charge qubit. Such single qubit operations on phase-charge qubits using magnetic fields are known in the art and described in Orlando et al., 1999, Phys. Rev. B, 60, 15398, and Il'ichev et al., 2003, LANL preprint server, cond-mat/0303433, which is hereby incorporated by reference in its entirety.

In accordance with the present invention, methods and structures for realizing single and two-qubit operations for a phase-charge qubit are provided. In some embodiments of the present invention, manipulating the charge of the phase-charge qubit using charge control apparatus 220 and/or readout apparatus 230 achieves a single qubit $\sigma^x$ gate operation on the information stored in phase-charge qubit 201. In some embodiments of the present invention, the Hamiltonian of phase-charge qubit 201 and charge control apparatus 220 can be described by:

$$H = \epsilon(f) \cdot \sigma_z + \Delta(n_g) \cdot \sigma_x,$$

where $\sigma_z$ and $\sigma_x$ are Pauli matrices, $\epsilon(f)$ is the phase-charge qubit flux bias, $\Delta(n_g)$ is the energy splitting between the states of the system, and $n_g = C_g V_g / 2e$ is the dimensionless gate charge.

In accordance with embodiments of the present invention, implementing a single qubit operation on a phase-charge qubit includes setting the gate charge $n_g$ of the charge control apparatus 220 and/or readout apparatus 230 to a non-zero value for a time $\Delta t$. In some embodiments of the invention, the single qubit operation is a $\sigma^z$-based single qubit operation. In some embodiments of the invention, computational operation of the phase-charge qubit includes controlling the gate charge $n_g$ of the charge control apparatus 220 and/or readout apparatus 230 to controllably achieve both single- and two-qubit operations. In some embodiments of the present invention, implementing a single qubit $\sigma^z$ operation on a phase-charge qubit includes changing the magnitude of the dimensionless gate charge to a range between 0.01 and 5. Furthermore, the duration of the operation $\Delta t$ can range from 0.1 picoseconds (ps) to 500 nanoseconds (ns).

In some embodiments, performing a quantum operation comprises biasing the operating point of the superconducting phase-charge qubit away from the center of the point of computational operation (using, for example, bias source 110), and applying a gate charge. In some embodiments, the gate charge includes a direct signal and an alternating signal component. In some embodiments, the phase-charge qubit is magnetically biased $\pm\Delta$ away from the center of the point of computational operation. When the phase-charge qubit is biased in this manner, an alternating signal component can be applied to the phase-charge qubit having an appropriate frequency, and an off-diagonal single qubit operation results. An example of an off-diagonal single qubit operation is based on a $\sigma^y$ matrix. In some embodiments of the present invention, an alternating signal component has a frequency ranging between about 400 megaHertz (MHz) and about 50 gigaHertz (GHz). As used here, the term "about" means ±5% of the base value. For example, 400 megaHertz (MHz) ±0.05×400 MHz.

In accordance with the present invention, a combination of (i) the $\sigma^z$ gate operation, (ii) the off-diagonal single qubit operation (e.g., $\sigma^y$), and controllable coupling as described above in conjunction with FIG. 4, satisfies the condition for universal quantum computation. In some embodiments, satisfying universal quantum computation includes providing single qubit operations using an inductively coupled magnetic field, in combination with the controllable charge coupling of the present invention.

In some embodiments of the present invention, the flux bias (e.g., bias source 110 of FIG. 2), typically used to hold the phase-charge qubit at the operating point, applies a magnetic flux over one or more phase-charge qubits in the system. In accordance with the present invention, since single qubit operations are to be realized using charge control of the phase-charge qubit, it is not required to maintain single qubit control using the flux bias. Hence, in contrast to previous proposals where each phase-charge qubit has a corresponding flux bias, embodiments of the present invention enable phase-charge qubits to share flux bias while still achieving universal quantum computation.

Nearest Neighbor Qubit Coupling

With reference to FIG. 6, in accordance with an embodiment of the present invention, a plurality of phase-charge qubits are coupled in the charge basis in a nearest neighbor scheme. Nearest neighbor coupling is an alternative approach to bus coupling and generally means that any given qubit is coupled to adjacent qubits in a register of qubits. Although such a coupling scheme is less general than a bus coupling scheme, such as the bus coupling scheme illustrated in FIG. 5, the constraints on implementation of the bus coupling scheme are simplified, and hence the register of qubits can be easier to manufacture than a corresponding register of qubits that uses a bus coupling scheme. For an example of nearest neighbor coupling, see Brennen et al., 2003, Phys. Rev. A 637, 050302, which is hereby incorporated by reference in its entirety.

FIG. 6 illustrates an embodiment of the present invention for nearest neighbor coupling of phase-charge qubits 201 in the charge basis. System 600 illustrates a chain of phase-charge qubits 201-1 through 201-N, where capacitive couplings 640-1 through 640-(N-1) separate each qubit 201. Each phase-charge qubit 201 further includes a gate charge 220 and a mechanism 230 for readout. In some embodiments, mechanisms 230 comprise a gate charge for tuning the charge of the corresponding qubit island to which the mechanism 230 is attached. In some embodiments, gate charge 220 comprises a mechanism for readout and mechanism 230 is not present.

In some embodiments of the present invention, performing an entanglement operation between a first and second phase-charge qubit 201 in a chain of phase-charge qubits 600 comprises performing a sequence of one or more swap operations until the first and second qubit states are adjacent, tuning the first and second phase-charge qubits to the charge regime for a length of time t, and, optionally, performing the same sequence of one or more swap operations to return the first and second phase-charge qubit states to their original locations in the chain. In some embodiments, the first and second phase-charge qubit states are not returned to their original locations. Methods for performing entanglement operations have previously been proposed. See, for example, U.S. patent application Ser. No. 09/782,886, filed Feb. 13, 2001, entitled "Optimization method for quantum computing process," which is hereby incorporated by reference in its entirety.

Inductive and Capacitive Qubit Coupling

In previous embodiments, the assumption has been made that when islands coupled to each other enter the charge state, they capacitively couple and do not inductively couple. However, in some embodiments of the present invention, this is not the case. In such embodiments, both inductive and capacitive coupling between phase-charge qubits is realized. This is possible when (i) the loops of qubits 201 are sufficiently large and (ii) the islands entering the charge state are proximate to each other (e.g., the configuration shown in FIG. 4). Such inductive coupling between phase-charge qubits can result in always-on coupling. This can be advantageous in certain quantum computing applications. For example, if a coupling mechanism between adjacent qubits is provided in the charge-basis (e.g., capacitor 440 of FIG. 4), then the magnitude of the entanglement between the phase-charge qubits can be modulated by controlling the charge regime coupling (e.g. by using device 110 of FIG. 4).

In some embodiments of the present invention, one or more phase-charge qubits in a quantum register can be inductively coupling and capacitively coupled. Entanglement between the one or more phase-charge qubits is adjusted by tuning the one or more phase-charge qubits in the charge-coupled basis. In FIG. 4, for example, the tuning could be done by any one of the devices 220, 110, or a combination thereof.

In some embodiments, one or more phase-charge qubits in a quantum register have greater inductance than other phase-charge qubits in the quantum register. Greater inductances for phase-charge qubits are achieved by having a larger loop size. In some embodiments, one or more phase-charge registers in a quantum register have loop sizes 2 to 100 times larger than one or more of the loops in other qubits in the quantum register. In some embodiments, phase-charge qubits with a greater inductance have superconducting loop sizes ranging from about 5 square microns to about 30 square microns. In some embodiments, having one or more phase-charge qubits with a greater inductance provides a greater coupling strength between qubits, which can be advantageous for some quantum operations.

CONCLUSIONS AND REFERENCES CITED

All references cited herein are incorporated herein by reference in their entirety and for all purposes to the same extent as if each individual publication or patent or patent application was specifically and individually indicated to be incorporated by reference in its entirety for all purposes.

Unless noted otherwise, the substrates used to form the devices of the present invention are the same as those described in conjunction with FIG. 1. Moreover, unless noted otherwise, the materials used to manufacture the superconducting loops and Josephson junctions are the same as those described in conjunction with FIG. 1. Moreover, unless noted otherwise, the dimensions of the superconducting loops in the devices of the devices of the present invention and the dimensions and coupling energies of the Josephson junctions in the devices of the present invention have dimensions falling into the ranges for such components set forth herein in conjunction with FIG. 1. In some embodiments, one or more of the islands of each phase-charge qubit in any of the embodiments described herein is mesoscopic in size.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A quantum computing structure comprising:
a superconducting charge-readable phase-qubit characterized by a Josephson energy $E_J$ and a charging energy $E_C$ that are dimensioned such that, when a gate charge is applied to the superconducting charge-readable phase-qubit, a charge of the qubit will depend on a quantum state of the qubit; and
first mechanism for detecting a charge of said superconducting charge-readable phase-qubit; wherein the first mechanism is capacitively connected to said superconducting charge-readable phase-qubit.

2. The quantum computing structure of claim 1, further comprising a second mechanism for controlling a charge of said superconducting charge-readable phase-qubit wherein said second mechanism comprises a gate charge.

3. The quantum computing structure of claim 2, wherein said gate charge includes an alternating signal (AC) and a direct signal (DC) component.

4. The quantum computing structure of claim 2, wherein said gate charge applies a voltage with a magnitude between 1 picoVolt and 1 Volt to said superconducting charge-readable phase-qubit.

5. The quantum computing structure of claim 1, wherein said first mechanism comprises a gate capacitance coupled to said superconducting charge-readable phase-qubit.

6. The quantum computing structure of claim 5, wherein said gate capacitance is between 1 zeptoFarad (zF) and 100 picoFarad (pF).

7. The quantum computing structure of claim 1, wherein said superconducting charge-readable phase-qubit comprises a superconducting loop is made of aluminum or niobium.

8. The quantum computing structure of claim 1, wherein said superconducting charge-readable phase-qubit comprises a superconducting loop interrupted by at least two Josephson junctions thereby forming at least two islands in said superconducting loop.

9. The quantum computing structure of claim 8, wherein said at least two Josephson junctions consists of three Josephson junctions.

10. The quantum computing structure of claim 9, wherein one of said three Josephson junctions has either
(i) a different Josephson energy or a different charging energy than either of the other two Josephson junctions of said three Josephson junctions; or
(ii) a different Josephson energy and a different charging energy than either of the other two Josephson junctions of said three Josephson junctions.

11. The quantum computing structure of claim 9, wherein each Josephson junction in said three Josephson junctions
has the same Josephson energy and charging energy, or any one of the three Josephson junctions respectively has
(i) a different Josephson energy or a different charging energy than both of the other two Josephson junctions of said three Josephson junctions; or
(ii) a different Josephson energy and a different charging energy than both of the other two Josephson junctions of said three Josephson junctions.

12. The quantum computing structure of claim 8, wherein one or more Josephson junctions in said at least two Josephson junctions includes an insulating layer.

13. The quantum computing structure of claim 1, wherein said superconducting charge-readable phase-qubit comprises a superconducting loop interrupted by a plurality of Josephson junctions, and wherein each adjacent pair of Josephson junctions in said plurality of Josephson junctions defines an island in said superconducting loop.

14. The quantum computing structure of claim 13, the quantum computing structure further comprising a second mechanism for controlling a charge of said superconducting charge-readable phase-qubit and wherein said second mechanism is coupled to a first island in said superconducting loop and said first mechanism is coupled to a different second island of said superconducting loop.

15. The quantum computing structure of claim 13, the quantum computing structure further comprising a second mechanism for controlling a charge of said superconducting charge-readable phase-qubit and wherein said first mechanism is coupled to a first island of said superconducting loop and said second mechanism is coupled to a second island of said superconducting loop.

16. The quantum computing structure of claim 1, wherein said first mechanism comprises an electrometer.

17. The quantum computing structure of claim 16, wherein said electrometer comprises a radio frequency Single Electron Transistor (rf-SET).

18. The quantum computing structure of claim 1, wherein said first mechanism comprises a measurement capacitance coupled to said superconducting charge-readable phase-qubit.

19. The quantum computing structure of claim 18, wherein said measurement capacitance has a value between 1 zF and 100 pF.

20. The quantum computing structure of claim 1, further comprising a mechanism for biasing said superconducting charge-readable phase-qubit, wherein said mechanism for biasing said superconducting charge-readable phase-qubit is inductively or capacitively coupled to the superconducting charge-readable phase-qubit.

21. The quantum computing structure of claim 20, wherein said mechanism for biasing is inductively coupled to said superconducting charge-readable phase-qubit thereby inductively coupling a magnetic field to said superconducting charge-readable phase-qubit.

22. The quantum computing structure of claim 20, wherein said mechanism for biasing is configured to apply a magnetic flux with a magnitude between zero flux quanta ($0\Phi_0$) and five flux quanta ($5\Phi_0$) to said superconducting charge-readable phase-qubit.

23. The quantum computing structure of claim 1, wherein said superconducting charge-readable phase-qubit comprises a superconducting loop and an inner perimeter of said superconducting loop defines an area between 0.05 $\mu m^2$ and 250000 $\mu m^2$.

24. The quantum computing structure of claim 1, wherein said superconducting charge-readable phase-qubit comprises a superconducting loop and an inner perimeter of said superconducting loop defines an area between 0.1 $\mu m^2$ and 250000 $\mu m^2$.

25. The quantum computing structure of claim 1, wherein said superconducting charge-readable phase-qubit comprises a superconducting loop and an inner perimeter of said superconducting loop defines an area of 1 $\mu m^2$.

26. A quantum computing structure comprising:
a plurality of superconducting phase-charge qubits, wherein all or a portion of said plurality of superconducting phase-charge qubits each comprise a superconducting loop having at least two islands; wherein a first qubit and a second qubit in said plurality of superconducting phase-charge qubits are coupled such that
when a first gate voltage is applied to the first qubit and a second gate voltage is applied to the second qubit said first and second qubit are capacitively coupled; and
when said first gate voltage is not applied to said first qubit or said second gate voltage is not applied to the second qubit, said first qubit and said second qubit are not capacitively coupled and said first qubit and said second qubit store information;
and wherein all or a portion of the superconducting phase-charge qubits in said plurality of superconducting phase-charge qubits each has a corresponding first mechanism, wherein each respective first mechanism
is configured to tune a charge of a first island in the at least two islands of the superconducting loop in the corresponding superconducting phase-charge qubit; and
is configured to couple the corresponding superconducting phase-charge qubit to another superconducting charge-readable phase-qubit in said plurality of superconducting phase-charge qubits.

27. The quantum computing structure of claim 26, wherein said plurality of superconducting phase-charge qubits form a linear chain.

28. The quantum computing structure of claim 27, wherein the at least two superconducting phase-charge qubits that are capacitively coupled to each other are adjacent to each other in said linear chain.

29. The quantum computing structure of claim 27, wherein the at least two superconducting phase-charge qubits that are capacitively coupled to each other are not adjacent to each other in said linear chain.

30. The quantum computing structure of claim 26, wherein the at least two superconducting phase-charge qubits that are capacitively coupled to each other have a coupling capacitance with a value between 1 zF and 100 nanoFarads (nF).

31. The quantum computing structure of claim 26, wherein each said first mechanism comprises a gate charge.

32. The quantum computing structure of claim 31, wherein said gate charge has a magnitude between 1 picoVolt and 1 Volt.

33. The quantum computing structure of claim 26, wherein each said respective first mechanism comprises a gate capacitance between said respective first mechanism and the corresponding superconducting phase-charge qubit in said plurality of superconducting phase-charge qubits.

34. The quantum computing structure of claim 26, further comprising a second mechanism for measuring a charge of a superconducting phase-charge qubit in the plurality of superconducting phase-charge qubits.

35. The quantum computing structure of claim 26, further comprising a second mechanism for measuring a charge of each superconducting phase-charge qubit in said plurality of superconducting phase-charge qubits.

36. The quantum computing structure of claim 26, further comprising a mechanism for biasing each superconducting phase-charge qubit in all or a portion of the superconducting phase-charge qubits in the plurality of superconducting phase-charge qubits.

37. The quantum computing structure of claim 36, wherein said mechanism for biasing is configured to apply a magnetic flux with a magnitude between zero flux quanta ($0\Phi_0$) and five flux quanta ($5\Phi_0$) to each superconducting phase-charge qubit in all or a said portion of the superconducting phase-charge qubits in the plurality of superconducting phase-charge qubits.

38. The quantum computing structure of claim 26, wherein an island in the at least two islands in the superconducting loop of a superconducting phase-charge qubit in the plurality of superconducting phase-charge qubits is defined by a first Josephson junction and a second Josephson junction in the superconducting loop.

39. The quantum computing structure of claim 26, wherein an inner perimeter of each said superconducting loop defines an area between 0.05 $\mu m^2$ and 250000 $\mu m^2$.

40. The quantum computing structure of claim 26, wherein an inner perimeter of each said superconducting loop defines an area between 0.1 $\mu m^2$ and 250000 $\mu m^2$.

41. The quantum computing structure of claim 26, wherein an inner perimeter of each said superconducting loop defines an area of 1 $\mu^2$.

42. A method for measuring a charge state of a superconducting charge-readable phase-qubit, the method comprising:
tuning a charge of a first island in a plurality of islands in the superconducting charge-readable phase-qubit, wherein the superconducting charge-readable phase-qubit comprises a superconducting loop and wherein a plurality of Josephson junctions in the superconducting loop define said plurality of islands in the superconducting loop; and
capacitively detecting a charge of said superconducting charge-readable phase-qubit and wherein
said superconducting charge-readable phase-qubit is characterized by a Josephson energy $E_J$ and a charging energy $E_C$ that are dimensioned such that, when a gate charge is applied to the superconducting charge-readable phase-qubit, said charge will depend on a quantum state of the qubit.

43. The method of claim 42, wherein said detecting comprises detecting the charge of said first island.

44. The method of claim 42, wherein the detecting comprises detecting the charge of an island in said plurality of islands other than the first island.

45. The method of claim 42, wherein the tuning the charge of the first island comprises applying a gate charge to the first island.

46. The method of claim 45, wherein said gate charge has a magnitude between 1 picoVolt and 1 Volt.

47. The method of claim 42, wherein the charge of said superconducting charge-readable phase-qubit corresponds to one of a first basis state or a second basis state of said superconducting charge-readable phase-qubit.

48. A method for achieving a qubit operation on a superconducting charge-readable phase-qubit, the method comprising:
tuning a first island of said superconducting charge-readable phase-qubit for a duration $\Delta t$, wherein the superconducting charge-readable phase-qubit comprises a superconducting loop and wherein a plurality of Josephson junctions in the superconducting loop define a plurality of islands in the superconducting loop, the plurality of islands including said first island; and
capacitively measuring a charge on said superconducting charge-readable phase-qubit, wherein
said superconducting charge-readable phase-qubit is characterized by a Josephson energy $E_J$ and a charging energy $E_C$ that are dimensioned such that, when a gate charge is applied to the superconducting charge-readable phase-qubit, a charge of said superconducting charge-readable phase-qubit will depend on a quantum state of the superconducting charge-readable phase-qubit.

49. The method of claim 48, wherein the tuning comprises applying said gate charge to said superconducting charge-readable phase-qubit.

50. The method of claim 49, wherein said gate charge comprises a direct signal component and an alternating signal component.

51. The method of claim 49, wherein the magnitude of said gate charge is between 1 picoVolt and 1 Volt.

52. The method of claim 50, wherein said alternating signal component is zero.

53. The method of claim 50, wherein said alternating signal component has a frequency between 400 megaHertz and 50 gigaHertz.

54. The method of claim 48, wherein said duration $\Delta t$ is between 0.1 picoseconds and 500 nanoseconds.

55. A method for entangling a plurality of superconducting phase-charge qubits, wherein each superconducting charge-readable phase-qubit in all or a portion of the plurality of superconducting phase-charge qubits comprises a respective superconducting loop interrupted by a plurality of Josephson junctions thereby forming a plurality of islands in the respective superconducting loop, and wherein each said plurality of islands includes a first island and a second island, the method comprising:
capacitively coupling a bus island to each of two or more first islands; and
tuning the charge of the capacitively coupled two or more first islands for a duration $\Delta t$.

56. The method of claim 55, the method further comprising:
tuning a readout gate charge that is capacitively coupled to two or more second islands.

57. The method of claim 56, wherein said tuning said readout gate charge that is capacitively coupled to said two or more second islands comprises applying a gate charge to said two or more second islands.

58. The method of claim 57, wherein the magnitude of said gate charge is between 1 picoVolt and 1 Volt.

59. The method of claim 55, wherein said duration $\Delta t$ is between 10 picoseconds and 10 microseconds.

60. The method of claim 55, wherein said duration $\Delta t$ is between 1 nanosecond and 500 nanoseconds.

61. A method for reading out a quantum state of each superconducting phase-charge qubit in a plurality of superconducting phase-charge qubits, wherein each superconducting phase-charge qubit in all or a portion of the plurality of superconducting phase-charge qubits comprises a respective superconducting loop interrupted by a plurality of Josephson junctions thereby collectively forming a plurality of islands in the respective superconducting loop, the method comprising:

capacitively coupling a readout device to a first island in each superconducting phase-charge qubit in all or a portion of the plurality of superconducting phase-charge qubits;

tuning the charge of each said capacitively coupled first island; and reading out the charge on each said capacitively coupled first island.

62. The method of claim 61 further comprising tuning a gate charge, wherein said gate charge is capacitively coupled to an island in each superconducting phase-charge qubit in all or a portion of the plurality of superconducting phase-charge qubits.

63. The method of claim 62, wherein said gate charge is capacitively coupled to said first island in each superconducting phase-charge qubit in said all or said portion of the plurality of superconducting phase-charge qubits.

64. The method of claim 62, wherein said gate charge is capacitively coupled to an island other than said first island in each superconducting phase-charge qubit in said plurality of superconducting phase-charge qubits.

65. The method of claim 62, wherein said tuning comprises applying a gate charge to each said capacitively coupled first island in the plurality of superconducting phase-charge qubits.

66. The method of claim 65, wherein the magnitude of said gate charge is between 1 picoVolt and 1 Volt.

67. The method of claim 62, wherein said reading out comprises detecting the charge on each said capacitively coupled first island.

68. A method of quantum computing comprising:

tuning a charge of a first island of a first superconducting charge-readable phase-qubit for a duration $\Delta t$, wherein the first superconducting charge-readable phase-qubit comprises a superconducting loop and wherein a plurality of Josephson junctions interrupting the superconducting loop collectively define a plurality of islands in the superconducting loop, the plurality of islands including said first island;

biasing the operating point of the first superconducting charge-readable phase-qubit away from a center of a point of computational operation of the first superconducting charge-readable phase-qubit;

applying a gate charge to the first superconducting charge-readable phase-qubit during said biasing; and capacitively coupling the first superconducting charge-readable phase-qubit to second superconducting charge-readable phase-qubit such that when a first gate voltage is applied to the first superconducting charge-readable phase-qubit and a second gate voltage is applied to the second superconducting charge-readable phase-qubit said first and said second superconducting charge-readable phase-qubit are capacitively coupled; and when said first gate voltage is not applied to said first superconducting charge-readable phase-qubit or said second gate voltage is not applied to the second superconducting charge-readable phase-qubit, said first superconducting charge-readable phase-qubit and said second superconducting charge-readable phase-qubit are not capacitively coupled and said first superconducting charge-readable phase-qubit and said second superconducting charge-readable phase-qubit store information.

69. The method of claim 68 wherein said tuning applies a $\sigma^x$ gate operation to said first superconducting charge-readable phase-qubit.

70. The method of claim 68 wherein said gate charge includes a direct signal component and an alternating signal component.

71. The method of claim 70 wherein said alternating signal component has a frequency ranging between about 400 megaHertz (MHz) and about 50 gigaHertz (GHz).

72. The method of claim 68 wherein said gate charge applies a $\sigma^y$ Pauli matrix to said first superconducting charge-readable phase-qubit.

73. A method of quantum computing using a first superconducting phase-charge qubit and a second superconducting charge-readable phase-qubit, the method comprising:

applying a first gate charge on said first superconducting phase-charge qubit for a duration $t_1$;

applying a second gate charge on said second superconducting phase-charge qubit for a duration $t_2$; and capacitively coupling said first superconducting phase-charge qubit to said second superconducting phase-charge qubit for a duration $t_3$ such that when a first gate voltage is applied to the first superconducting phase-charge qubit and a second gate voltage is applied to the second superconducting phase-charge qubit said first and second qubit are capacitively coupled; and when said first gate voltage is not applied to said first qubit or said second gate voltage is not applied to the second qubit said first qubit and said second qubit are not capacitively coupled and said first qubit and said second qubit store information.

74. The method of claim 73, wherein said first applying step and said second applying step are performed concurrently such that all or a portion of said duration $t_1$ overlaps with all or a portion of said duration $t_2$.

75. The method of claim 73, wherein said first applying step and said capacitively coupling step are performed concurrently such that all or a portion of said duration $t_1$ overlaps with all or a portion of said duration $t_3$.

76. The method of claim 73, wherein said second applying step and said capacitively coupling step are performed concurrently such that all or a portion of said duration $t_2$ overlaps with all or a portion of said duration $t_3$.

77. The method of claim 73, wherein said first applying step, said second applying step and said capacitively coupling step are performed concurrently such that all or a portion of each of said duration $t_1$, said duration $t_2$, and said duration $t_3$ overlap with each other.

78. A method of quantum computing using a first superconducting phase-charge qubit and a second superconducting phase-charge qubits, the method comprising:

applying a first gate charge on a first island of said first superconducting phase-charge qubit for a duration $t_1$ while a second island of said first superconducting phase-charge qubit remains in a phase basis;

applying a second gate charge on a first island of said second superconducting phase-charge qubit for a duration $t_2$ while a second island of said second superconducting phase-charge qubit remains in a phase basis; and capacitively coupling said first island of said first superconducting phase-charge qubit to said first island of said second superconducting phase-charge qubit for a duration $t_3$.

79. The method of claim 78, further comprising:

reading out the state of the first superconducting phase-charge qubit.

80. The method of claim 79, wherein
said first charge is removed from said first island of said first superconducting phase-charge qubit during said reading out; and
said second charge is removed from said first island of said second superconducting phase-charge qubit during said reading out.

81. A superconducting charge-readable phase-qubit comprising:
a superconducting loop;
a plurality of Josephson junctions, each Josephson junction in the plurality of Josephson junctions having a Josephson energy, wherein each Josephson junction in the plurality of Josephson junctions interrupts the superconducting loop; and
a plurality of mesoscopic islands, wherein each mesoscopic island in the plurality of mesoscopic islands is a portion of the superconducting loop defined by adjacent Josephson junctions in the plurality of Josephson junctions; and
wherein a smallest Josephson junction in the plurality of Josephson junctions has a Josephson energy that is between one quarter and four times the Josephson energy of the largest Josephson junction in the plurality of Josephson junctions; and
wherein the superconducting loop has a charging energy that is between one eight and eight times the Josephson energy of the largest Josephson junction in the plurality of Josephson junctions.

82. The superconducting charge-readable phase-qubit of claim 81, wherein the superconducting loop has a charging energy that is between one half and two times the Josephson energy of the largest Josephson junction in the plurality of Josephson junctions.

83. The superconducting charge-readable phase-qubit of claim 81, further comprising a voltage source capacitively coupled to a first mesoscopic island in the plurality of mesoscopic islands.

84. The quantum computing structure of claim 1 wherein said superconducting charge-readable phase-qubit comprises a superconducting loop interrupted by at least two Josephson junctions and wherein said Josephson energy $E_J$ is the Josephson energy of a first Josephson junction of said at least two Josephson junctions; and
said charging energy $E_C$ is the charging energy of the first Josephson junction of said at least two Josephson junctions.

85. The method of claim 48, wherein said capacitively measuring a charge on said superconducting charge-readable phase-qubit follows said tuning a first island of said superconducting charge-readable phase-qubit for a duration $\Delta t$, and a plurality of qubit operations.

86. A quantum computing structure comprising:
a superconducting charge-readable phase-qubit;
a first mechanism for controlling a charge of said superconducting charge-readable phase-qubit; and
a second mechanism for detecting a charge of said superconducting charge-readable phase-qubit; wherein the first mechanism and the second mechanism are each capacitively connected to said superconducting charge-readable phase-qubit.

87. A quantum computing structure comprising:
a superconducting charge-readable phase-qubit comprising a superconducting loop interrupted by three Josephson junctions, the three Josephson junctions defining three regions of the superconducting loop;
a ground coupled to one of the three regions of the superconducting loop; and
a charge control apparatus capacitively coupled to one of the three regions of the superconducting loop;
wherein a first Josephson junction in said three Josephson junctions has a Josephson energy with a value that is between 0.04 times to 25 times (i) the magnitude of the Josephson energy of the second Josephson junction and (ii) the magnitude of the Josephson energy of the third Josephson junction in the three Josephson junctions, and wherein
the superconducting charge-readable phase-qubit is characterized by a Josephson energy $E_J$ and a charging energy $E_C$ that are dimensioned such that, when a gate charge is applied to the superconducting charge-readable phase-qubit, a charge of the qubit will depend on a quantum state of the qubit.

88. The quantum computing structure of claim 87, further comprising an electrometer coupled to one of three regions of the superconducting loop.

89. A quantum computing structure comprising:
a superconducting charge-readable phase-qubit having a superconducting loop that is interrupted by three Josephson junctions, wherein each adjacent pair of Josephson junctions in said three Josephson junctions defines one of three regions of the superconducting loop;
a ground coupled to one of the three regions of the superconducting loop;
a charge control apparatus capacitively coupled to one of the three regions of the superconducting loop; and
an electrometer capacitively coupled to one of the three regions of the superconducting loop;
wherein the ratio between the Coulomb energy of a first of the three regions and the Josephson energy of a Josephson junction that defines the first of the three regions is between 0.5 and 4; and
wherein a first Josephson junction in the three Josephson junctions has a Josephson energy with a value that is between 0.04 and 25 times the magnitude of the Josephson energy of a second Josephson junction in the three Josephson junctions.

90. The quantum computing structure of claim 89, wherein the first Josephson junction has a Josephson energy with a value that is 0.05 to 18 times the magnitude of the Josephson energy of the second Josephson junction.

91. A superconducting charge-readable phase-qubit comprising:
a loop of low temperature superconducting material;
a plurality of Josephson junctions, each with a Josephson energy and a capacitance, interrupting the loop, the plurality of Josephson junctions thereby defining an equal plurality of regions of the loop;
an electrometer capacitively coupled to a region of the plurality of regions of the superconducting loop; and
a ground coupled to one of the regions; wherein
a region in the plurality of regions of the loop is held at electrical ground; and
each region of the loop has a charging energy, defined in part by the capacitance of the adjacent Josephson junctions, and wherein the ratio between the charging energy of one of the plurality of regions and the Josephson energy of one of the Josephson junctions that defines the same one of the plurality of regions is between 0.5 and 4.

92. The superconducting charge-readable phase-qubit of claim 91, wherein during operation of the superconducting charge-readable phase-qubit, quantum information is stored as a superposition of a first basis state and a second basis state, and wherein the first basis state and the second basis state are clockwise and counterclockwise circulating persistent currents in the loop of low temperature superconducting material.

93. A superconducting charge-readable phase-qubit comprising:
   a superconducting loop;
   three Josephson junctions interrupting the superconducting loop, each Josephson junction having a Josephson energy and a capacitance, wherein each Josephson junction interrupts the superconducting loop; and
   three islands, wherein each island is a region of the superconducting loop that is defined by a pair of adjacent Josephson junctions in the three Josephson junctions; wherein
   each respective island has a charging energy;
   at least one island in the three island is mesoscopic; and
   a respective mesoscopic island in the at least one mesoscopic island has a charging energy equal to the Josephson energy of one of the Josephson junctions in the pair of Josephson junctions that define the respective mesoscopic island; and
   a first Josephson junction in the three Josephson junctions has a Josephson energy
   with a value that is between 0.04 and 18 times the magnitude of the Josephson energy of a second Josephson junction in the three Josephson junctions.

94. The superconducting charge-readable phase-qubit of claim 93, wherein during operation of the superconducting charge-readable phase-qubit, quantum information is stored as a superposition of a first basis state and a second basis state, and wherein the first basis state and the second basis state are respectively clockwise and counterclockwise circulating persistent currents in the superconducting loop.

95. The superconducting charge-readable phase-qubit of claim 93, further comprising a ground coupled to a first island in the three islands.

96. The quantum computing structure of claim 15 wherein the first island and the second island are the same island.

* * * * *

UNITED STATES PATENT AND TRADEMARK OFFICE
CERTIFICATE OF CORRECTION

| | | |
|---|---|---|
| PATENT NO. | : 7,335,909 B2 | Page 1 of 1 |
| APPLICATION NO. | : 10/934049 | |
| DATED | : February 26, 2008 | |
| INVENTOR(S) | : Mohammad H. S. Amin et al. | |

It is certified that error appears in the above-identified patent and that said Letters Patent is hereby corrected as shown below:

<u>Column 26</u>
Claim 1, line 26, "first mechanism for detecting" should read as --a first mechanism for detecting--.

Claim 1, line 26, "phase-qubit wherein" should read as --phase-qubit; wherein--.

<u>Column 29</u>
Claim 41, line 31, "1 $\mu^2$" should read as --1 $\mu m^2$--.

<u>Column 31</u>
Claim 41, line 31, "to second superconducting" should read as --to a second superconducting--.

Signed and Sealed this

Twenty-eighth Day of July, 2009

JOHN DOLL
*Acting Director of the United States Patent and Trademark Office*